United States Patent
Kim et al.

(10) Patent No.: US 11,308,324 B2
(45) Date of Patent: Apr. 19, 2022

(54) OBJECT DETECTING SYSTEM FOR DETECTING OBJECT BY USING HIERARCHICAL PYRAMID AND OBJECT DETECTING METHOD THEREOF

(71) Applicant: SAMSUNG ELECTRONICS CO., LTD., Suwon-si (KR)

(72) Inventors: Byeoungsu Kim, Hwaseong-si (KR); Sangsoo Ko, Yongin-si (KR); Sanghyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 76 days.

(21) Appl. No.: 16/837,224

(22) Filed: Apr. 1, 2020

(65) Prior Publication Data
US 2021/0064872 A1 Mar. 4, 2021

(30) Foreign Application Priority Data
Aug. 26, 2019 (KR) .................. 10-2019-0104574

(51) Int. Cl.
*G06K 9/00* (2006.01)
*G06K 9/32* (2006.01)
(Continued)

(52) U.S. Cl.
CPC ....... *G06K 9/00664* (2013.01); *G06K 9/3233* (2013.01); *G06N 3/04* (2013.01);
(Continued)

(58) Field of Classification Search
CPC .. G06K 9/00664; G06K 9/3233; G06K 9/627; G06K 9/00791; G06K 9/00624;
(Continued)

(56) References Cited

U.S. PATENT DOCUMENTS

| 5,063,603 A * | 11/1991 | Burt ................ G06K 9/00255 382/115 |
| 9,275,308 B2 | 3/2016 | Szegedy et al. |

(Continued)

FOREIGN PATENT DOCUMENTS

| DE | 690 32 326 T2 | 9/1998 |
| DE | 11 2016 005 059 T5 | 8/2018 |

(Continued)

OTHER PUBLICATIONS

Lin, Tsung-Yi et al., "Feature Pyramid Networks for Object Detection", 2017 IEEE Conference on Computer Vision and Pattern Recognition (CVPR), Jul. 21, 2017-Jul. 26, 2017, pp. 2117-2125. (10 pages total).

(Continued)

*Primary Examiner* — Ping Y Hsieh
(74) *Attorney, Agent, or Firm* — Sughrue Mion, PLLC

(57) ABSTRACT

An object detecting system, which detects an object by using a hierarchical pyramid structure includes: a pyramid image generator configured to receive a plurality of input images respectively corresponding to a plurality of time points and generate a plurality of pyramid images corresponding to each of the plurality of input images; an object extractor configured to generate a plurality of pieces of object data by extracting at least one object from the plurality of pyramid images; and a buffer storing the plurality of pieces of object data on an object basis.

20 Claims, 16 Drawing Sheets

(51) Int. Cl.
  *G06T 7/00* (2017.01)
  *G06N 3/04* (2006.01)

(52) U.S. Cl.
  CPC ...... *G06T 7/97* (2017.01); *G06T 2207/20016* (2013.01); *G06T 2207/20081* (2013.01); *G06T 2207/20084* (2013.01)

(58) Field of Classification Search
  CPC ............ G06T 7/97; G06T 2207/20084; G06T 2207/20016; G06T 2207/20081; G06T 7/0002; G06N 3/04; G06N 3/0454; G06N 3/08
  See application file for complete search history.

(56) References Cited

U.S. PATENT DOCUMENTS

| | | | |
|---|---|---|---|
| 9,311,711 | B2 | 4/2016 | Kosaki |
| 9,965,719 | B2 | 5/2018 | Choi et al. |
| 2014/0023279 | A1 | 1/2014 | Fahn et al. |
| 2017/0124415 | A1* | 5/2017 | Choi ............ G06K 9/628 |
| 2018/0300880 | A1* | 10/2018 | Fan ............ G06K 9/4628 |
| 2019/0026538 | A1* | 1/2019 | Wang ............ G06K 9/4642 |

FOREIGN PATENT DOCUMENTS

| | | |
|---|---|---|
| JP | 4561380 B2 | 10/2010 |
| JP | 2019-28985 A | 2/2019 |
| KR | 10-1890612 B1 | 8/2018 |
| KR | 10-1912569 B1 | 10/2018 |

OTHER PUBLICATIONS

Liu, Wei et al., "SSD: Single Shot MultiBox Detector", arXiv:1512.02325v5 [cs.CV], Dec. 29, 2016, pp. 1-17. (17 pages total).

Redmon. Joseph, "YOLO Real-Time Object Detection", May 19, 2016, https://pjreddie.com/darknet/yolo/. (11 pages total).

Parekh, Himani S. et al., "A Survey on Object Detection and Tracking Methods", International Journal of Innovative Research in Computer and Communication Engineering, Feb. 2014, vol. 2, Issue 2, pp. 2970-2978. (9 pages total).

"Objekterkennung" Wikipedia, Accessed Feb. 1, 2021, URL: https://de.wikipedia.org/w/index.php?title=Objekterkennung&oldid=186198697, 4 pages.

"Bildpyramide" Wikipedia, Accessed Jan. 21, 2021, URL: https://de.wikipedia.org/w/index.php?title=Bildpyramide&oldid=188151074, 4 pages.

Office Action dated Feb. 1, 2021 by the German Patent and Trademark Office in corresponding German Application No. 10 2020 107 868.4.

* cited by examiner

OBJECT DETECTING SYSTEM FOR DETECTING OBJECT BY USING HIERARCHICAL PYRAMID AND OBJECT DETECTING METHOD THEREOF

CROSS-REFERENCE TO RELATED APPLICATION

This application claims priority from Korean Patent Application No. 10-2019-0104574, filed on Aug. 26, 2019, in the Korean Intellectual Property Office, the disclosure of which is herein incorporated by reference in its entirety.

BACKGROUND

1. Field

The disclosure relates to an object detecting system, and more particularly, to an object detecting system and an object detecting method for detecting an object by using a hierarchical pyramid.

2. Description of Related Art

Object detection refers to a data processing method of detecting an object of interest from an image or a video and identifying or classifying the object. Object detection takes an important role in various applications, such as automatic driving, driving assistance, unmanned aerial vehicles, and gesture-based interaction systems.

Along with the development of artificial intelligence technology, object detection methods and object classification and identification methods using deep learning techniques and training based on neural networks have been developed, and these methods have been widely deployed.

SUMMARY

Embodiments of the disclosure provide an object detecting system capable of adding, to at least one pyramid image generated by using an input image, time information indicating the time at which the input image is captured, and detecting an object from the input image by using the added time information; and an object detecting method used by the object detecting system.

According to an aspect of the disclosure, there is provided an object detecting system including: a pyramid image generator configured to receive a first input image captured at a first time and a second input image captured at a second time, and generate a first pyramid image from the first input image and a second pyramid image from the second input image; an object extractor configured to detect an object in the first pyramid image and the second pyramid image and generate a plurality of pieces of object data representing the object; and a buffer storing the plurality of pieces of object data representing the object detected in the first input image and the second input image.

According to another aspect of the disclosure, there is provided an object detecting method including: receiving a first input image captured at a first time and a second input image captured at a second time; generating a first pyramid image associated with the first time from the first input image and a second pyramid image associated with the second time from the second input image; and storing the plurality of pieces of object data in a buffer.

According to yet another aspect of the disclosure, there is provided a driving assistance system for driving a vehicle by detecting an object, the driving assistance system including: a pyramid image generator configured to receive a first input image captured at a first time and a second input image captured at a second time and generate a first pyramid image from the first input image and a second pyramid image from the second input image; an object extractor configured to detect an object in the first pyramid image and the second pyramid image and generate a plurality of pieces of object data representing the object, by using deep learning that is based on a neural network; a buffer storing the plurality of pieces of object data representing the object detected in the first input image and the second input image; and an object tracker configured to track the object based on the plurality of pieces of object data stored in the buffer.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Hereinafter, embodiments of the disclosure will be described in detail with reference to the accompanying drawings.

Figure 1:
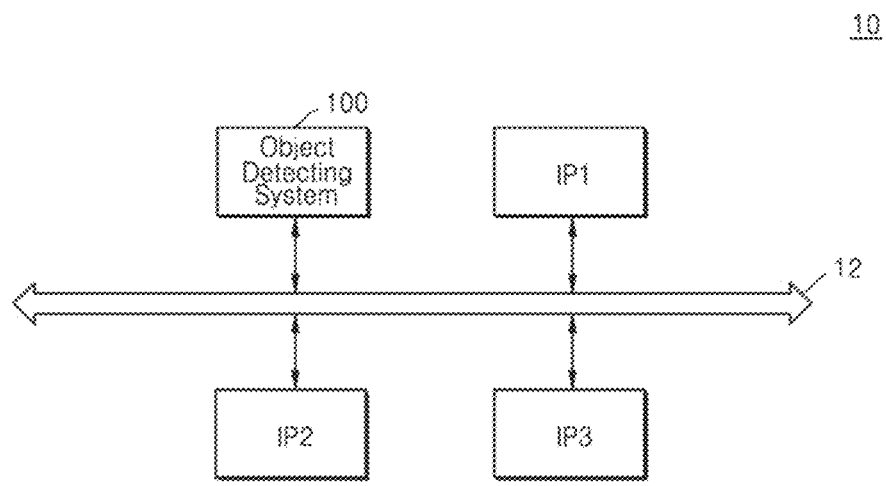
FIG. 1 is a block diagram illustrating an electronic system according to an embodiment of the disclosure.

FIG. 1 is a block diagram illustrating an electronic system according to an embodiment of the disclosure.

Referring to FIG. 1, an electronic system 10 may extract information by analyzing input data in real time and, based on the extracted information, may determine a situation or may control components of an electronic device in which the electronic system 10 is disposed. In one example, the electronic system 10 may detect an object from an input image and may track the detected object. As used herein, the term "object" may refer to at least one selected from a building, a thing, a person, an animal, and a plant, which are of interest to a user or the electronic system 10. For example, the electronic system 10 may be applied to a drone, an advanced drivers assistance system (ADAS), a robotic device, a smart TV, a smartphone, a medical device, a mobile device, an image display device, a measurement device, an Internet-of-Things (IoT) device, or the like and may be mounted in one of various electronic devices in addition thereto.

The electronic system 10 may include at least one intellectual property (IP) block (IP1, IP2, IP3, . . . IPn) and an object detecting system 100. For example, the electronic system 10 may include first to third IP blocks IP1 to IP3, but the electronic system may include any quantity of IP blocks.

The electronic system 10 may include various IP blocks. For example, the IP blocks may include a processing unit, a plurality of cores included in a processing unit, various sensor modules, a multi-format codec (MFC), a video module (for example, a camera interface, a Joint Photographic Experts Group (JPEG) processor, a video processor, a mixer, or the like), a 3-dimensional (3D) graphic core, an audio system, a driver, a display driver, volatile memory, non-volatile memory, a memory controller, an input-and-output interface block, cache memory, or the like. Each of the first to third IP blocks IP1 to IP3 may include at least one of the various IP blocks set forth above.

The IP blocks may be connected to each other through at least one system bus 12. For example, as a standard bus specification, an Advanced Microcontroller Bus Architecture (AMBA) protocol of Advanced RISC Machine (ARM) Ltd. may be used. A bus type of the AMBA protocol may include Advanced High-Performance Bus (AHB), Advanced Peripheral Bus (APB), Advanced eXtensible Interface (AXI), AXI4, AXI Coherency Extensions (ACE), or the like.

The object detecting system 100 may receive an input image, may detect an object included in the input image, and may track the detected object or may extract a background by excluding the detected object from the input image. As used herein, the term "object" may refer to at least one selected from a building, a thing, a person, an animal, and a plant, which are of interest to a user and are selected by the user or the electronic system 10. The term "background" may refer to the remainder of the image obtained by excluding the object from an image frame. In one embodiment, the object detecting system 100 may detect an object, which is included in input image data, by using a neural network and may track the extracted object. This will be described below in detail with reference to FIG. 2. In one embodiment, the object detecting system 100 may generate at least one pyramid image by down-sampling an input image and may extract an object based on the at least one pyramid image. Herein, a structure, in which an object is hierarchically extracted based on a plurality of pyramid images generated by down-sampling one piece of image data and having different resolutions from each other, may be referred to as a pyramid structure. This will be described below in detail with reference to FIG. 6. In addition, for descriptive convenience, the terms "input image" and "pyramid image" used herein may respectively refer to data corresponding to the input image and data corresponding to the pyramid image.

According to the disclosure, when generating at least one pyramid image, the object detecting system 100 may add, to the at least one pyramid image, time information corresponding to a time at which the input image is captured. The object detecting system 100 may use the time information together in addition to spatial information according to at least one pyramid when detecting and tracking an object. As a result, detection performance of the object detecting system 100 may be improved.

Figure 2:
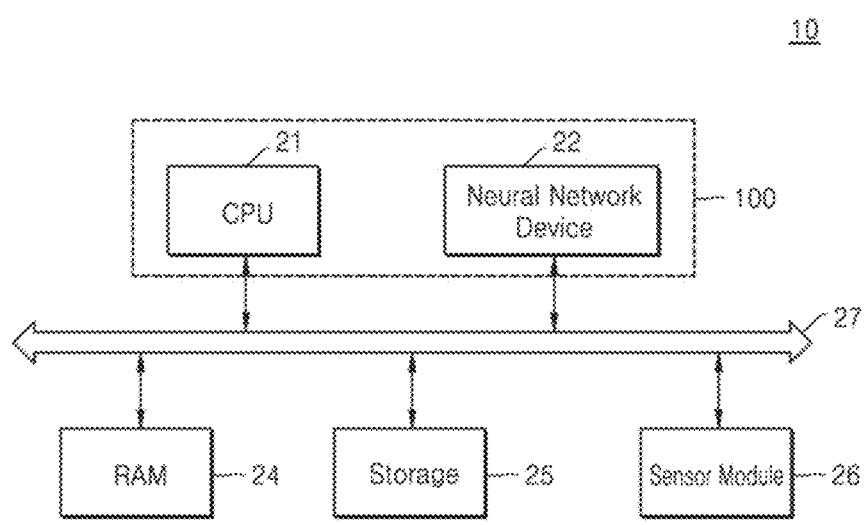
FIG. 2 is a block diagram illustrating an electronic system according to an embodiment of the disclosure.

FIG. 2 is a block diagram illustrating an electronic system according to an embodiment of the disclosure. In particular, FIG. 2 illustrates an embodiment of the electronic system 10 shown in FIG. 1. Regarding the electronic system 10 of FIG. 2, repeated descriptions given with reference to FIG. 1 will be omitted.

Referring to FIG. 2, the electronic system 10 may include a central processing unit (CPU) 21, a neural network device 22, random access memory (RAM) 24, storage 25, and a sensor module 26. The electronic system 10 may further include an input-output module, a security module, a power control device, or the like and may also further include various calculation devices. In one embodiment, all or some of the components (the CPU 21, the neural network device 22, the RAM 24, the storage 25, and the sensor module 26) of the electronic system 10 may be mounted in one semiconductor chip. For example, the electronic system 10 may be implemented as a system-on-chip (SoC). The components of the electronic system 10 may communicate with each other via at least one system bus 27.

The CPU 21 may control overall operations of the electronic system 10. The CPU 21 may include a single processor core (that is, single-core) or a plurality of processor cores (that is, multi-core). The CPU 21 may process or execute programs and/or data stored in the storage 25 and loaded into RAM 24. In one embodiment, by executing programs stored in the storage 25, the CPU 21 may perform an operation of the object detecting system 100 described with reference to FIG. 1 or may control a function of the neural network device 22 for detecting an object. The neural network device 22 may generate a neural network, may train the neural network (or cause the neural network to learn), or may perform a calculation based on received input data and may generate an information signal based on a result of the calculation, or retrain the neural network. In one example, the neural network device 22 may receive an input image and may generate at least one piece of object data by extracting an object, which is included in the input image, through calculations included in the neural network. The neural network device 22 may be referred to as a computing unit, a computing module, or the like.

Models of the neural network may include various models such as a convolution neural network (CNN) including GoogleNet, AlexNet, VGG Network, or the like, a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) network, a classification network, and the like, without being limited thereto.

The neural network device 22 may include one or more processors for performing calculations according to the models of the neural network. In addition, the neural network device 22 may include separate memory for storing programs corresponding to the models of the neural network. The neural network device 22 may be referred to as a neural network processor, a neural network processing device, a neural network integrated circuit, a neural network processing unit (NPU), or the like.

The CPU 21 and the neural network device 22 may be included in the object detecting system 100 described with reference to FIG. 1. The object detecting system 100 may receive data corresponding to an input image from a particular IP (for example, the RAM 24 or the sensor module 26) and may detect an object included in the input image. In one embodiment, the CPU 21 included in the object detecting system 100 may generate at least one pyramid image having a pyramid structure by using an input image and may cause the generated pyramid image to include time information corresponding to time at which the input image is captured. In addition, the neural network device 22 included in the object detecting system 100 may extract an object included in the input image through deep learning, which is trained based on a network, based on space information and time information of the pyramid image, and may track the extracted object.

The RAM 24 may store programs, data, or instructions. For example, programs and/or data stored in the storage 25 may be loaded into the RAM 24 according to control by the CPU 21 or according to a booting code. The RAM 24 may be implemented by using memory such as dynamic RAM (DRAM) or static RAM (SRAM). The storage 25 is a storage location for storing data and may store, for example, an operating system (OS), various programs, and various pieces of data. The storage 25 may include at least one selected from volatile memory and non-volatile memory. The sensor module 26 may collect information around the electronic system 10. The sensor module 26 may sense or receive an image signal from outside the electronic system 10 and may convert the sensed or received image signal into image data, that is, an image frame. For this purpose, the sensor module 26 may include a sensing device, for example, at least one of various sensing devices such as an image pickup device, an image sensor, a light detection and ranging (LIDAR) sensor, an ultrasonic sensor, and an infrared sensor, or may receive a sensing signal from the sensing device. In one embodiment, the sensor module 26 may provide image data including an image frame to the CPU 21 or the neural network device 22. For example, the sensor module 26 may include an image sensor, may generate a video stream by taking images of an environment external to the electronic system 10, and may sequentially provide consecutive image frames of the video stream to the CPU 21 or the neural network device 22.

The electronic system 10 according to an embodiment of the disclosure may add time information corresponding to an image-capturing time of image data to at least one pyramid image when generating the at least one pyramid image, and may use the time information together in addition to spatial information according to the at least one pyramid image when detecting and tracking an object by using a neural network. Therefore, object detection performance of the electronic system 10 may be improved. As used herein, the term "spatial information" or "space information" may refer to pixel data of an input image.

Figure 3:
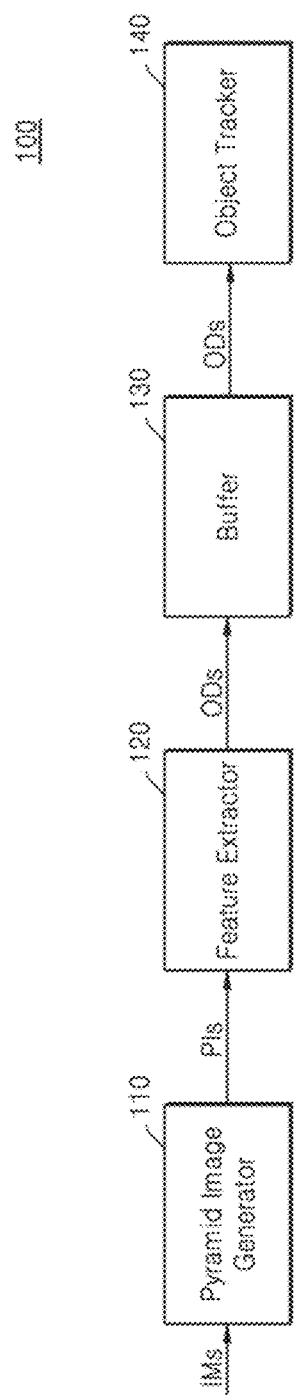
FIG. 3 is a block diagram illustrating an object detecting system according to an embodiment of the disclosure.

FIG. 3 is a block diagram illustrating an object detecting system according to an embodiment of the disclosure.

Referring to FIG. 3, an object detecting system 100 may include a pyramid image generator 110, a feature extractor 120, a buffer 130, and an object tracker 140. The pyramid image generator 110 may receive a plurality of input images IMs respectively captured at a plurality of time points and may generate a plurality of pyramid images PIs from the received plurality of input images IMs.

The pyramid image generator 110 may generate a plurality of pyramid images based on an input image corresponding to one time point and may cause each of the plurality of pyramid images to include time information about the time at which the input image is captured. In one example, the pyramid image generator 110 may generate a first pyramid image having a first resolution in correspondence with a first input image at a first time point, may generate a second pyramid image having a second resolution by down-sampling the first pyramid image, may generate a third pyramid image having a third resolution by down-sampling the second pyramid image, and may add data corresponding to the first time point, at which the first input image is captured, to the first pyramid image, the second pyramid image, and the third pyramid image. The number of pyramid images, which are generated by down-sampling and have different resolutions, may be adaptively determined according to a quantity and/or kinds and types of objects in the input image IM.

The pyramid image generator 110 may generate a plurality of pyramid images for each input image which corresponds to each of a plurality of time points. In one example, the pyramid image generator 110 may generate a fourth pyramid image having a first resolution in correspondence with a second input image at a second time point, may generate a fifth pyramid image having a second resolution by down-sampling the fourth pyramid image, may generate a sixth pyramid image having a third resolution by down-sampling the fifth pyramid image, and may add data corresponding to the second time point, at which the second input image is captured, to the fourth pyramid image, the fifth pyramid image, and the sixth pyramid image. In other words, the single time point at which the input image was captured may be added to all of the pyramid images generated from the input image. In one example, the pyramid image generator 110 may obtain information about an image-capturing time point from a meta area of an input image (for example, IMs) or may obtain the image-taking time point from an external device (for example, the sensor module 26 in FIG. 2).

In one embodiment, the pyramid image generator 110 may add time information about image-taking time of an input image to a header area of each of the generated plurality of pyramid images. The disclosure is not limited thereto, and an area for the pyramid image generator 110 to add the time information to each of the plurality of pyramid images may be variously determined.

In one embodiment, the pyramid image generator 110 may add the time information to only at least some of the plurality of pyramid images generated from the input image. In one example, the pyramid image generator 110 may add the time information to the first pyramid image having a first resolution and to the second pyramid image having a second resolution, but may not add the time information to the third pyramid image having a third resolution. In other words, the single time point at which the input image was captured may be added to only some or a subset of the pyramid images generated from the input image.

In one embodiment, the pyramid image generator 110 may variously determine the number of pyramid images, which are generated from the plurality of input images respectively corresponding to the plurality of time points and have one resolution. In one example, from the plurality of input images respectively corresponding to the plurality of time points, the pyramid image generator 110 may generate a first quantity of first pyramid images having a first resolution and generate a second quantity of second pyramid images having a second resolution. That is, the first quantity of first pyramid images may be generated from a first quantity of input images captured at different time points, and the second quantity of second pyramid images may be generated from a second quantity of input images captured at different time points.

The feature extractor 120 may receive the plurality of pyramid images PIs from the pyramid image generator 110 and may extract a plurality of pieces of object data ODs from the plurality of pyramid images PIs. In one embodiment, the feature extractor 120 may extract the plurality of pieces of object data ODs from the plurality of pyramid images PIs by using deep learning trained based on a neural network. In one example, the feature extractor 120 may be implemented by the neural network device 22 of FIG. 2.

According to the disclosure, the feature extractor 120 may extract pieces of object data corresponding to the same object from a plurality of pyramid images corresponding to a plurality of time points. The feature extractor 120 may receive the plurality of pyramid images, which correspond to one resolution, according to the plurality of time points from the pyramid image generator 110 and may detect and extract one object based on pieces of time information included in the plurality of pyramid images, thereby generating the pieces of object data. In one example, the feature extractor 120 may extract a first object from at least one first pyramid image having a first resolution, may extract a second object from at least one second pyramid image having a second resolution, and may extract a third object from at least one third pyramid image having a third resolution. In one embodiment, the first to third objects may be located apart from an image-taking position by as much as different distances, and this will be described in more detail with reference to FIG. 6. The feature extractor 120 may store at least one piece of object data ODs, which is extracted, in the buffer 130. In one embodiment, the feature extractor 120 may store the at least one piece of object data ODs in different buffers or in different areas of one buffer, according to each kind of object.

In one example, the feature extractor 120 may store, in a first area of the buffer 130, pieces of object data ODs corresponding to a first object and respectively corresponding to a plurality of time points, may store, in a second area of the buffer 130, pieces of object data ODs corresponding to a second object and respectively corresponding to a plurality of time points, and may store, in a third area of the buffer 130, pieces of object data ODs corresponding to a third object and respectively corresponding to a plurality of time points. In one example, the feature extractor 120 may store a plurality of pieces of object data in the buffer 130 on an object basis, based on a concatenation operation.

The buffer 130 may store pieces of object data ODs. For this purpose, the buffer 130 may include at least one selected from volatile memory and non-volatile memory. According to one embodiment of the disclosure, the buffer 130 may store the pieces of object data ODs in different areas thereof on an object basis. In another embodiment, the buffer 130 may include a plurality of storage devices and may store the pieces of object data ODs in different storage devices on an object basis.

The object tracker 140 may receive the pieces of object data ODs and may track an object based on the pieces of object data ODs. In one embodiment of the disclosure, when tracking one object, the object tracker 140 may use the pieces of object data ODs respectively corresponding to a plurality of time points. In one example, the object tracker 140 may track a first object by using a plurality of pieces of object data corresponding to a first resolution and may track a second object by using a plurality of pieces of object data corresponding to a second resolution.

According to one embodiment of the disclosure, the object tracker 140 may use the pieces of object data ODs respectively corresponding to a plurality of time points to extract one object. In one example, an object may have a greater amount of change of data over time than a background, and the object tracker 140 may efficiently track the object by comparing, with each other, the plurality of pieces of object data ODs respectively corresponding to a plurality of time points.

Figure 4:
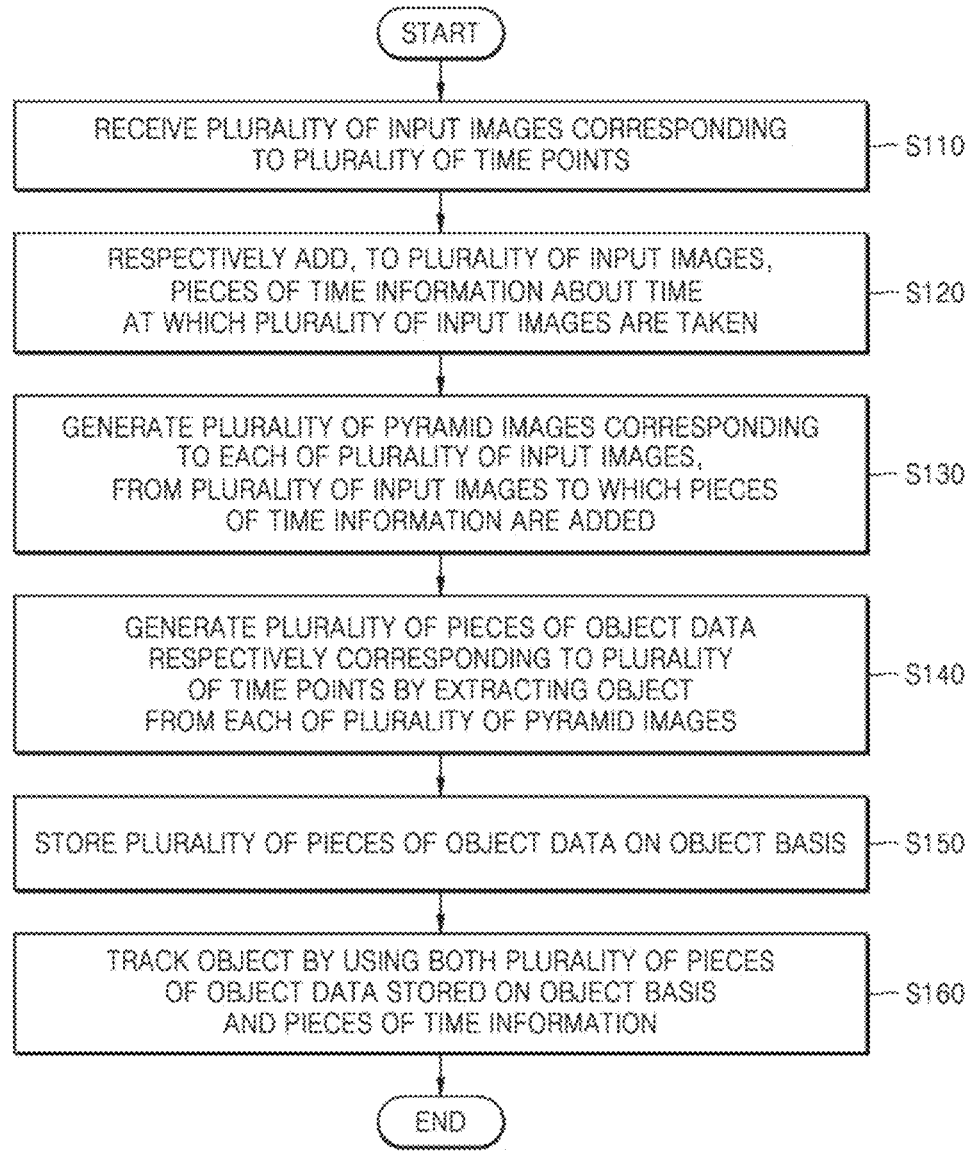
FIG. 4 is a flowchart illustrating a method of operating an object detecting system, according to an embodiment of the disclosure.

FIG. 4 is a flowchart illustrating a method of operating an object detecting system, according to an embodiment of the disclosure.

Referring to FIGS. 3 and 4, the object detecting system 100 may receive a plurality of input images respectively corresponding to a plurality of time points (S110) and may respectively add, to the plurality of input images, pieces of time information about image-capturing times of the plurality of input images (S120). The object detecting system 100 may generate a plurality of pyramid images corresponding to each of the plurality of input images by using the plurality of input images to which the pieces of time information are added. In one embodiment, the object detecting system 100 may generate the plurality of pyramid images by repeatedly down-sampling each input image to which time information is added.

The object detecting system 100 may generate a plurality of pieces of object data respectively corresponding to the plurality of time points by extracting an object from each of the plurality of pyramid images (S140). In one embodiment, the object detecting system 100 may generate the plurality of pieces of object data from the plurality of pyramid images by using a deep learning model trained based on a neural network. In one example, the object detecting system 100 may generate a plurality of pieces of time-point-by-time-point object data corresponding to one object.

The object detecting system 100 may store the plurality of pieces of object data on an object basis (S150). In one embodiment, the object detecting system 100 may store the plurality of pieces of time-point-by-time-point object data in different areas of a buffer on an object basis and may also store the plurality of pieces of time-point-specific object data in the buffer by using a concatenation operation. The object detecting system 100 may track position and/or movement of an object by using both the plurality of pieces of object data stored on an object basis and the pieces of time information (S160).

Figure 5:
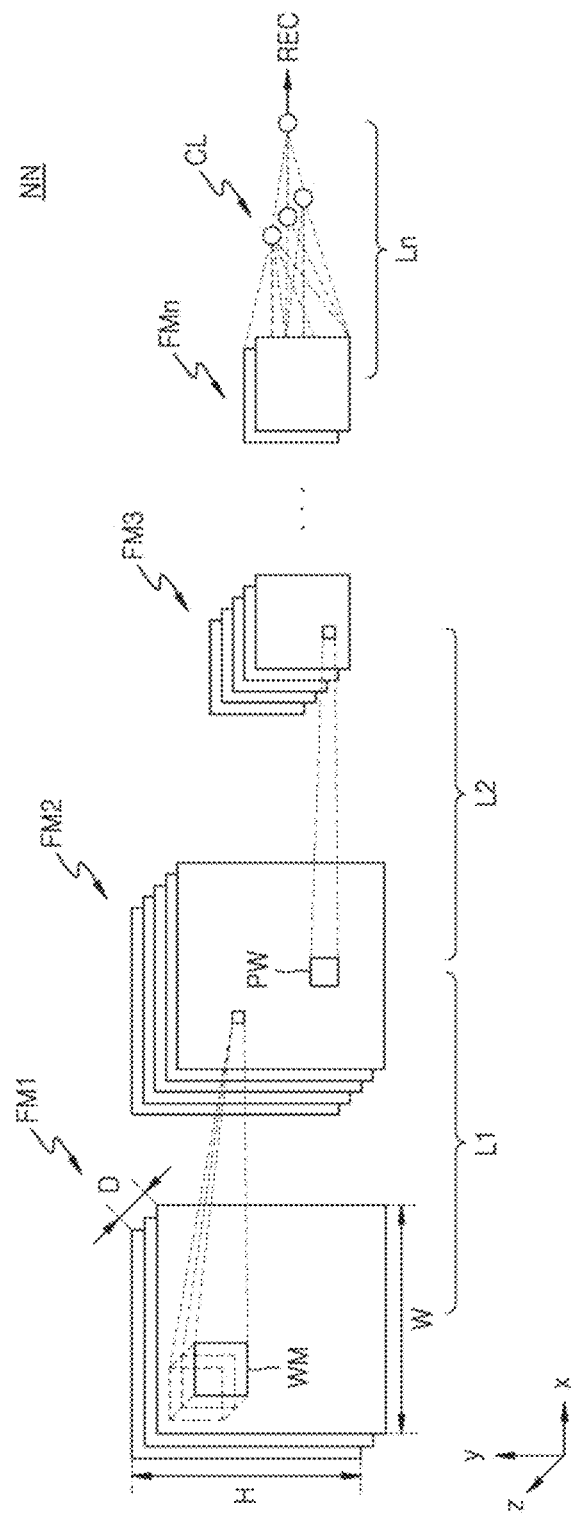
FIG. 5 is a diagram illustrating a neural network according to an embodiment of the disclosure.

FIG. 5 is a diagram illustrating a neural network according to an embodiment of the disclosure. In particular, FIG. 5 illustrates a structure of a convolution neural network, as an example of a neural network structure. FIG. 5 illustrates an example of a neural network used by the feature extractor 120 of FIG. 3.

Referring to FIG. 5, a neural network NN may include a plurality of layers L1, L2, . . . to Ln. Each of the plurality of layers L1, L2, . . . to Ln may be a linear or non-linear layer. In one embodiment, at least one linear layer and at least one non-linear layer may be coupled to each other and thus referred to as one layer. For example, a linear layer may include a convolution layer and a fully-connected layer, and a non-linear layer may include pooling and activation layers.

For example, a first layer L1 may be a convolution layer, a second layer L2 may be a pooling layer, and an n-th layer Ln may be a fully-connected layer as an output layer. The neural network NN may further include an activation layer and a layer performing another kind of operation apart from those operations discussed above.

Each of the plurality of layers L1 to Ln may receive, as an input feature map, input data (for example, an image frame) or a feature map generated by a previous layer and may calculate the input feature map, thereby generating an output feature map or a recognition signal REC. Here, the feature map refers to data in which various features of the input data are represented. Feature maps FM1 to FMn may each have, for example, a form of a 2-dimensional matrix or a 3-dimensional matrix (or a tensor). Each of the feature maps FM1 to FMn may have a width W (or a column), a height H (or a row), and a depth D, which may respectively correspond to an x-axis, a y-axis, and a z-axis in a coordinate system. Here, the depth D may be referred to as the number of channels.

The first layer L1 may generate a second feature map FM2 by convolution of a first feature map FM1 with a weight map WM. The weight map WM may filter the first feature map FM1 and may also be referred to as a filter or a kernel. The depth, that is, the number of channels, of the weight map WM may be equal to the depth, that is, the number of channels, of the first feature map FM1, and convolution may be performed between the same channels of both the weight map WM and the first feature map FM1. The weight map WM may be shifted in a manner in which the weight map WM traverses the first feature map FM1 by taking the first feature map FM1 as a sliding window. The amount of shift may be referred to as the term "stride length" or "stride." During each shift, weight values included in the weight map WM may each be multiplied by all pieces of pixel data in an area overlapping the first feature map. Then, results thereof may be added up by summation. Pieces of data of the first feature map FM1 in the area in which each of the weight values included in the weight map WM overlaps the first feature map FM1 may be referred to as extraction data. As the convolution between the first feature map FM1 and the weight map WM is performed, one channel of the second feature map FM2 may be generated. Although one weight map WM is illustrated in FIG. 3, the convolution of a plurality of weight maps with the first feature map FM1 may be performed, whereby a plurality of channels of the second feature map FM2 may be generated. In other words, the number of channels of the second feature map FM2 may correspond to the number of weight maps.

The second layer L2 may generate a third feature map FM3 by changing a spatial size of the second feature map FM2 through pooling. The term "pooling" may be referred to as the term "sampling" or "down-sampling." A 2-dimensional pooling window PW may be shifted on the second feature map FM2 in units of the size of the pooling window PW, and a maximum value among pieces of pixel data (or an average value of the pieces of pixel data) in an area overlapping the pooling window PW may be selected. Thus, the third feature map FM3, which has a spatial size different from a size of the second feature map FM2, may be generated. The number of channels of the third feature map FM3 is equal to the number of channels of the second feature map FM2. In one embodiment of the disclosure, the pooling window PW may perform various operations for extracting an object while being shifted on the feature maps FM2 and FM3.

The n-th layer Ln may classify a class (that is, CL) of the input data by making a combination of features of an n-th feature map FMn. In addition, the n-th layer Ln may generate the recognition signal REC corresponding to the class. In one embodiment, the input data may correspond to a pyramid image generated by using an input image, and the n-th layer Ln may recognize an object by extracting the class corresponding to the object included in an image, which is represented by frame data, based on the n-th feature map FMn provided by a previous layer. Accordingly, a recognition signal REC corresponding to the recognized object may be output. In one embodiment, the feature extractor 120 (FIG. 3) may store, in the buffer 130 (FIG. 3), the recognition signal REC as the object data ODs or may store, in the buffer 130 (FIG. 3), the object data ODs generated by using the recognition signal REC.

Figure 6:
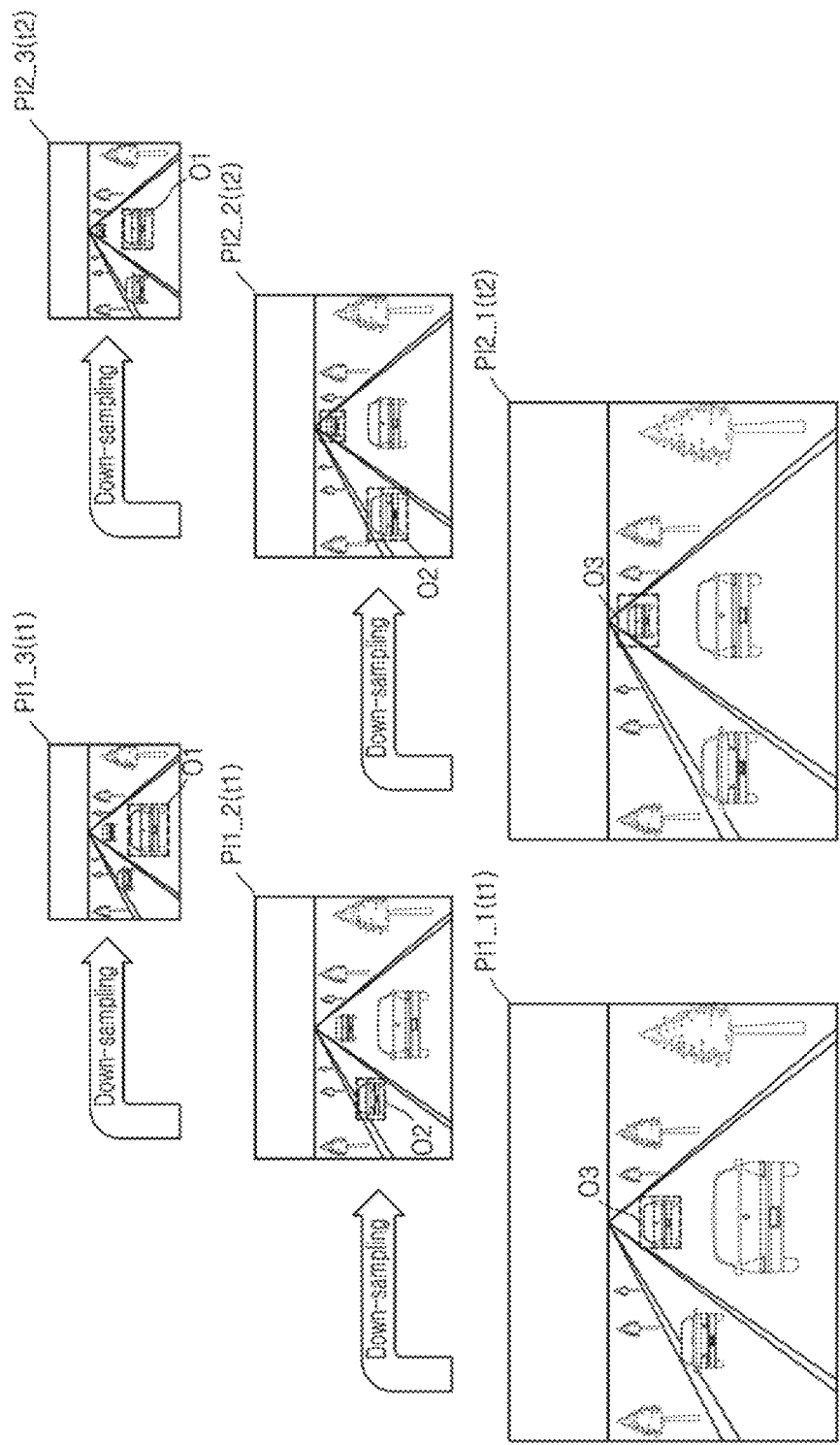
FIG. 6 is a diagram illustrating a method of detecting an object according to an embodiment of the disclosure.

FIG. 6 is a diagram illustrating a method of detecting an object according to an embodiment of the disclosure.

Referring to FIGS. 3 and 6, the pyramid image generator 110 may generate a first pyramid image PI1_1 having a first resolution, based on an input image captured at a first time point t1. The pyramid image generator 110 may generate a second pyramid image PI1_2 having a second resolution by down-sampling the first pyramid image PI1_1. The pyramid image generator 110 may generate a third pyramid image PI1_3 having a third resolution by down-sampling the second pyramid image PI1_2. The pyramid image generator 110 may perform down-sampling based on a pre-set integer ratio, and in one example, the pyramid image generator 110 may perform down-sampling by multiplying the resolution of an existing image by ½ or $1/\sqrt{2}$ The pyramid image generator 110 may generate a fourth pyramid image PI2_1 having the first resolution, based on the input image captured at a second time point t2. The pyramid image generator 110 may generate a fifth pyramid image PI2_2 having the second resolution by down-sampling the fourth pyramid image PI2_1. The pyramid image generator 110 may generate a sixth pyramid image PI2_3 having the third resolution by down-sampling the fifth pyramid image PI2_2.

According to one embodiment of the disclosure, the pyramid image generator 110 may add, to the first to third pyramid images PI1_1 to PI1_3, time information corresponding to the first time point t1 and may add, to the fourth to sixth pyramid images PI2_1 to PI2_3, time information corresponding to the second time point t2.

The feature extractor 120 may extract a plurality of objects from different pyramid images. In one example, the feature extractor 120 may extract a first object O1 located closest to an image-capturing device, which has generated the input image, by using the third pyramid image PI1_3 and the sixth pyramid image PI2_3 both having the third resolution that is the lowest resolution. Similarly, the feature extractor 120 may extract a second object O2 located next-closest to the image-capturing device, which has generated the input image, after the first object O1 by using the second pyramid image PI1_2 and the fifth pyramid image PI2_2 both having the second resolution that is the next-lowest resolution. In addition, the feature extractor 120 may extract a third object O3 located next-closest to the image-capturing device, which has generated the input image, after the second object O2 by using the first pyramid image PI1_1 and the fourth pyramid image PI2_1 both having the first resolution that is the highest resolution.

The object tracker 140 may track an object based on a plurality of pieces of object data generated by the feature extractor 120. According to one embodiment of the disclosure, to track one object, the object tracker 140 may use pieces of object data respectively corresponding to a plurality of time points by using pieces of time information. In one example, to track the third object O3, the object tracker 140 may further use object data generated from the fourth pyramid image PI2_1 and a time difference between the first time point t1 and the second time point t2, in addition to using object data generated from the first pyramid image PI1_1.

Although FIG. 6 illustrates an example of extracting three objects by using pyramid images having three resolutions, this is merely an example, the number of pyramid images used for object extraction may be variously determined, and the number of objects extracted by using these pyramid images may also be variously determined. In addition, it should be understood that the disclosure may also be applied to an embodiment in which two or more objects are extracted by using one pyramid image.

Figure 7:
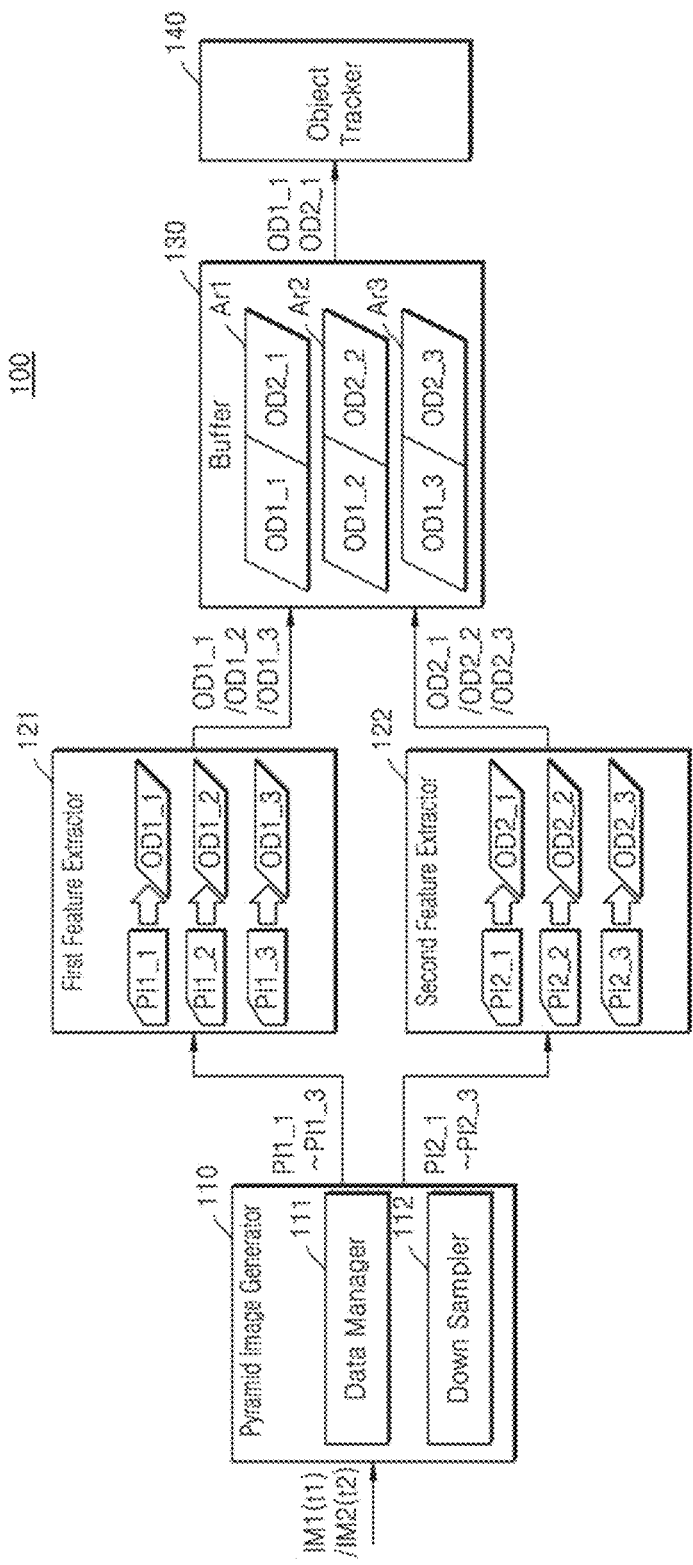
FIG. 7 is a block diagram illustrating an object detecting system according to an embodiment of the disclosure.

FIG. 7 is a block diagram illustrating an object detecting system according to an embodiment of the disclosure. In particular, FIG. 7 is a block diagram illustrating an embodiment in which an object is extracted based on input images captured at two time points. Redundant descriptions with reference to FIG. 3 will be omitted.

Referring to FIGS. 6 and 7, the object detecting system 100 may include the pyramid image generator 110, a first feature extractor 121, a second feature extractor 122, the buffer 130, and the object tracker 140. The pyramid image generator 110 may receive a first input image IM1 captured at the first time point t1 and a second input image IM2 captured at the second time point t2. The pyramid image generator 110 may include a data manager 111 and a down-sampler 112. The data manager 111 may generate the first pyramid image PI1_1 by adding, to the first input image IM1, time information corresponding to the first time point t1 and may generate the fourth pyramid image PI2_1 by adding, to the second input image IM2, time information corresponding to the second time point t2.

The down-sampler 112 may generate the second pyramid image PI1_2 and the third pyramid image PI1_3 by down-sampling the first pyramid image PI1_1. In addition, the down-sampler 112 may generate the fifth pyramid image PI2_2 and the sixth pyramid image PI2_3 by down-sampling the fourth pyramid image PI2_1.

The pyramid image generator 110 may output the generated first to third pyramid images PI1_1 to PI1_3 to the first feature extractor 121 and may output the generated fourth to sixth pyramid images PI2_1 to PI2_3 to the second feature extractor 122. The first feature extractor 121 may receive the first to third pyramid images PI1_1 to PI1_3 corresponding to the first time point t1 and may generate first to third object data OD1_1, OD1_2, and OD1_3 by respectively extracting objects from the received first to third pyramid images PI1_1 to PI1_3. In the example of FIG. 6, the first feature extractor 121 may generate the first object data OD1_1 by extracting a first object from the first pyramid image PI1_1, may generate the second object data OD1_2 by extracting a second object from the second pyramid image PI1_2, and may generate the third object data OD1_3 by extracting a third object from the third pyramid image PI1_3. The second feature extractor 122 may receive the fourth to sixth pyramid images PI2_1, PI2_2, and PI2_3 corresponding to the second time point t2 and may generate fourth to sixth object data OD2_1 to OD2_3 by respectively extracting objects from the received fourth to sixth pyramid images PI2_1 to PI2_3.

The first feature extractor 121 may store the generated first object data OD1_1 in a first area Ar1 of the buffer 130, may store the generated second object data OD1_2 in a second area Ar2 of the buffer 130, and may store the generated third object data OD1_3 in a third area Ar3 of the buffer 130. The second feature extractor 122 may store the generated fourth object data OD2_1 in the first area Ar1 of the buffer 130, may store the generated fifth object data OD2_2 in the second area Ar2 of the buffer 130, and may store the generated sixth object data OD2_3 in the third area Ar3 of the buffer 130.

In one embodiment, the first feature extractor 121 and the second feature extractor 122 may store the generated first to sixth object data OD1_1, OD1_2, OD1_3, OD2_1, OD2_2, and OD2_3 in the buffer 130 by using a concatenation operation. In addition, although FIG. 7 illustrates an embodiment in which pieces of object data (for example, OD1_1 to OD2_3) are stored in different areas (for example, Ar1 to Ar3) of one buffer 130 on an object basis, the disclosure may also be applied to an embodiment in which the pieces of object data (for example, OD1_1 to OD2_3) are stored in different buffers on an object basis, as described above.

The object tracker 140 may track objects by using the first to sixth object data OD1_1 to OD2_3 stored on an object basis. In one example, the object tracker 140 may read the first object data OD1_1 and the fourth object data OD2_1 stored in the first area Ar1 of the buffer 130 and may track the first object by using the first object data OD1_1 and the fourth object data OD2_1. Although FIG. 7 illustrates an embodiment in which objects are extracted based on input images respectively corresponding to two time points, this is merely an example, and it should be understood that the disclosure may also be applied to an embodiment in which objects are extracted based on input images respectively corresponding to more than two time points.

Figure 8:
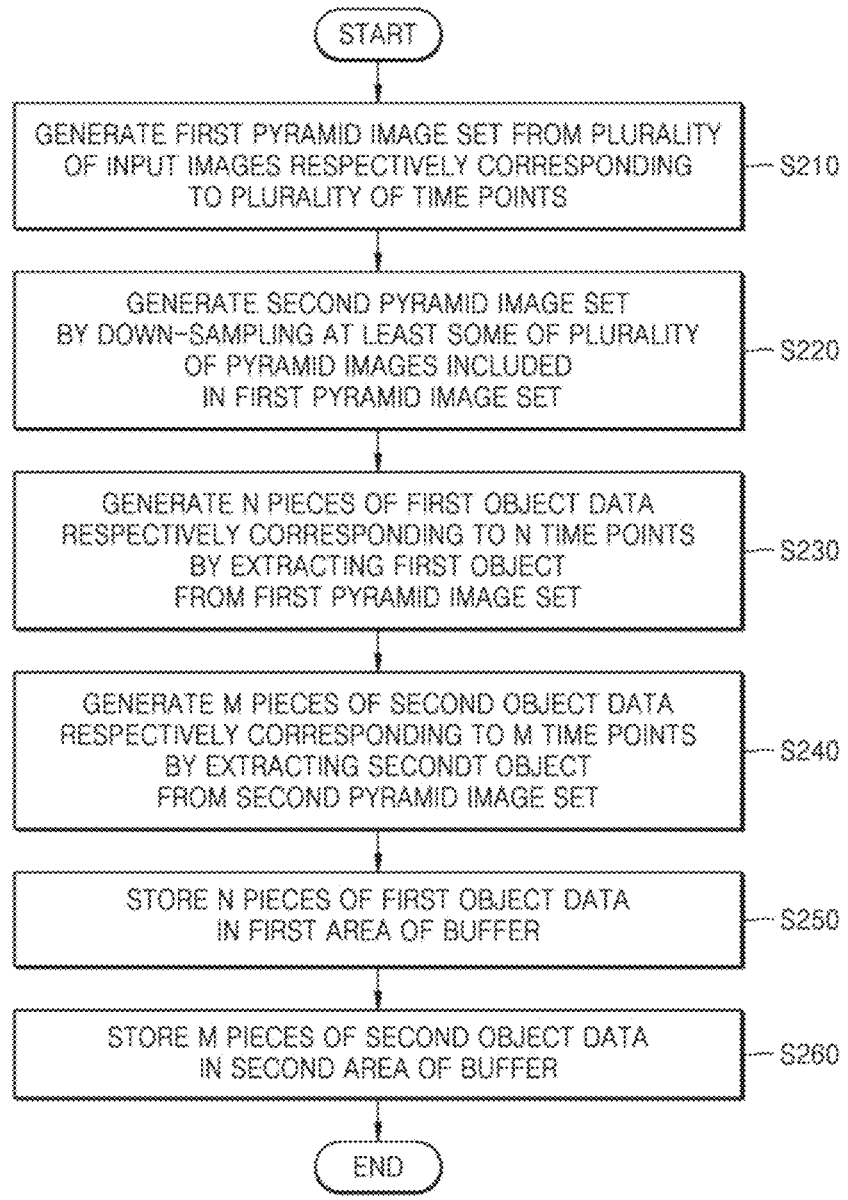
FIG. 8 is a flowchart illustrating a method of operating an object detecting system, according to an embodiment of the disclosure.

FIG. 8 is a flowchart illustrating a method of operating an object detecting system, according to an embodiment of the disclosure. In particular, FIG. 8 illustrates a method of operating an object detecting system, which detects an object by using a different number of pyramid images for each resolution.

Referring to FIGS. 3 and 8, the object detecting system 100 may generate a first pyramid image set having a first resolution by using a plurality of input images respectively corresponding to a plurality of time points (S210). The object detecting system 100 may generate a second pyramid image set having a second resolution by down-sampling at least some of a plurality of pyramid images included in the first pyramid image set (S220).

The object detecting system 100 may generate N pieces of first object data (where N is a natural number) respectively corresponding to N time points by extracting a first object from the first pyramid image set (S230). The object detecting system 100 may generate M pieces of second object data (where M is a natural number that is different from N) respectively corresponding to M time points by extracting a second object from the second pyramid image set (S240). The object detecting system 100 may store the N pieces of first object data in a first area of the buffer 130 (S250) and may store the M pieces of second object data in a second area of the buffer 130 (S260). In one embodiment, the number N of pieces of first object data may be greater than the number M of pieces of second object data. According to one embodiment of the disclosure, the object detecting system 100 may generate object data by extracting an object by using a different number of pyramid images for each resolution. In one example, the object detecting system 100 may generate object data by using more pyramid images in the case of the first object having insufficient space information than in the case of the second object having relatively much space information. In other words, an object at a position distant from a position at which an image is captured may appear small in the image. Therefore, the object may be represented by a correspondingly small amount of information and/or pixels. Thus, for an object having insufficient space information in the image, the object may be extracted by using an increased quantity of pyramid images. As a result, additional space information and pixel information regarding the object may be obtained from the additional pyramid images, thereby improving object extraction performance.

Figure 9:
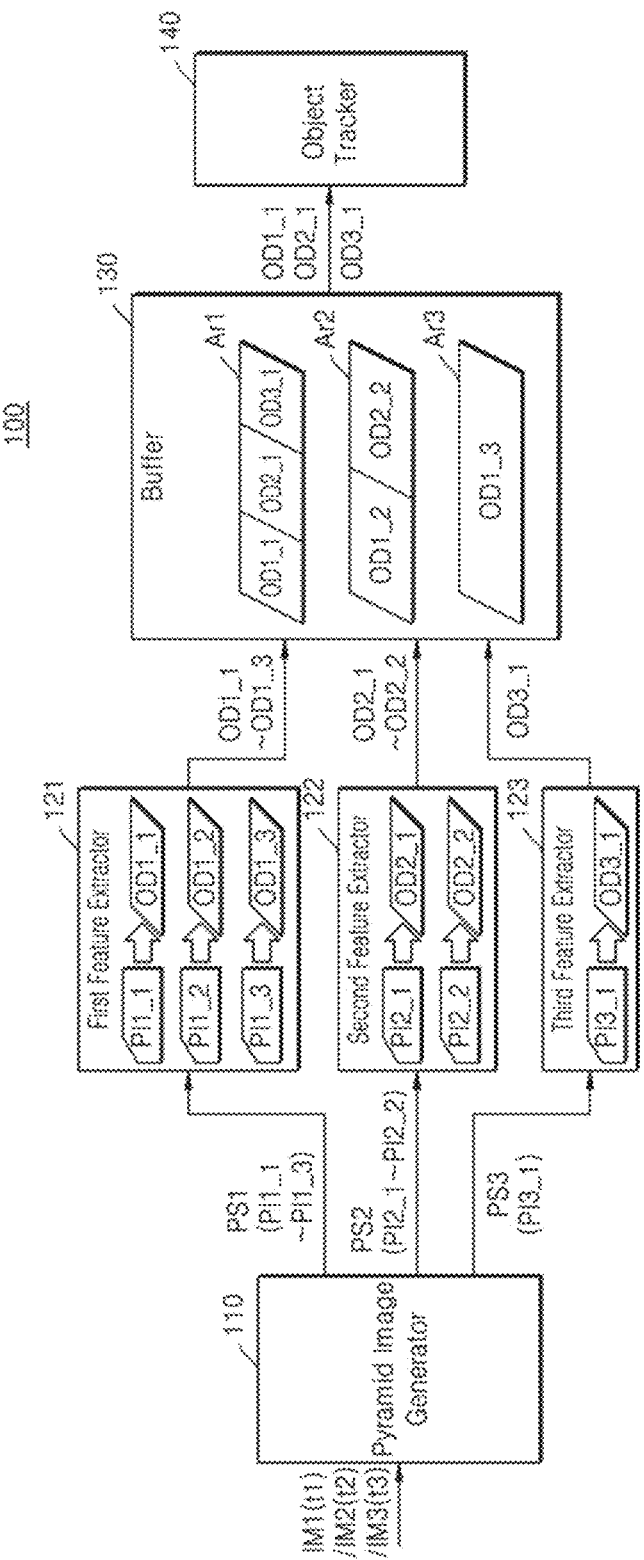
FIG. 9 is a block diagram illustrating an object detecting system according to an embodiment of the disclosure.

FIG. 9 is a block diagram illustrating an object detecting system according to an embodiment of the disclosure. In particular, FIG. 9 illustrates an object detecting system, which detects an object by using a different number of pyramid images for each resolution. Redundant descriptions with reference to FIG. 7 will be omitted.

Referring to FIG. 9, the object detecting system 100 may include the pyramid image generator 110, the first feature extractor 121, the second feature extractor 122, a third feature extractor 123, the buffer 130, and the object tracker 140. The pyramid image generator 110 may receive the first input image IM1 captured at the first time point t1, the second input image IM2 captured at the second time point t2, and a third input image IM3 captured at a third time point t3.

The pyramid image generator 110 may generate the first pyramid image PI1_1 by adding time information corresponding to the first time point t1 to the first input image IM1, may generate the second pyramid image PI1_2 by down-sampling the first pyramid image PI1_1, and may generate the third pyramid image PI1_3 by down-sampling the second pyramid image PI1_2. The pyramid image generator 110 may output, to the first feature extractor 121, the first to third pyramid images PI1_1 to PI1_3 as a first pyramid image set PS1.

The pyramid image generator 110 may generate the fourth pyramid image PI2_1 by adding time information corresponding to the second time point t2 to the second input image IM2 and may generate the fifth pyramid image PI2_2 by down-sampling the fourth pyramid image PI2_1. The pyramid image generator 110 may output, to the second feature extractor 122, the fourth and fifth pyramid images PI2_1 and PI2_2 as a second pyramid image set PS2. The pyramid image generator 110 may generate a sixth pyramid image PI3_1 by adding time information corresponding to the third time point t3 to the third input image IM3 and may output the sixth pyramid image PI3_1 as a third pyramid image set PS3 to the third feature extractor 123.

The first feature extractor 121 may receive the first to third pyramid images PI1_1 to PI1_3 corresponding to the first time point t1 and may generate the first to third object data OD1_1, OD1_2, and OD1_3 by respectively extracting objects from the received first to third pyramid images PI1_1 to PI1_3. In the example of FIG. 9, the first feature extractor 121 may generate the first object data OD1_1 by extracting a first object from the first pyramid image PI1_1, may generate the second object data OD1_2 by extracting a second object from the second pyramid image PI1_2, and may generate the third object data OD1_3 by extracting a third object from the third pyramid image PI1_3. The first feature extractor 121 may store the generated first object data OD1_1 in the first area Ar1 of the buffer 130, may store the generated second object data OD1_2 in the second area Ar2 of the buffer 130, and may store the generated third object data OD1_3 in the third area Ar3 of the buffer 130.

The second feature extractor 122 may receive the fourth and fifth pyramid images PI2_1 and PI2_2 corresponding to the second time point t2 and may generate the fourth and fifth object data OD2_1 and OD2_2 by respectively extracting objects from the received fourth and fifth pyramid images PI2_1 and PI2_2. The second feature extractor 122 may store the generated fourth object data OD2_1 in the first area Ar1 of the buffer 130 and may store the generated fifth object OD2_2 in the second area Ar2 of the buffer 130.

The third feature extractor 123 may receive the sixth pyramid image PI3_1 corresponding to the third time point t3 and may generate the sixth object data OD3_1 by extracting the third object from the received sixth pyramid image PI3_1. The third feature extractor 123 may store the generated sixth object data OD3_1 in the first area Ar1 of the buffer 130.

The object tracker 140 may track objects by using the first to sixth object data OD1_1 to OD3_1 stored on an object basis. In one example, the object tracker 140 may track the first object by using the first object data OD1_1, the fourth object data OD2_1, and the sixth object data OD3_1, which are stored in the first area Ar1 of the buffer 130.

According to one embodiment of the disclosure, the object detecting system 100 may detect an object by using a different number of pyramid images for each object. In one example, the object detecting system 100 may detect the third object by using three pyramid images (for example, PI1_1, PI2_1, and PI3_1), may detect the second object by using two pyramid images (for example, PI1_2 and PI2_2), and may detect the first object by using one pyramid image (for example, PI1_3). In one embodiment, the object detecting system 100 may detect an object by using fewer pyramid images as the object is farther away from an image capturing position at which the image are captured.

Figure 10:
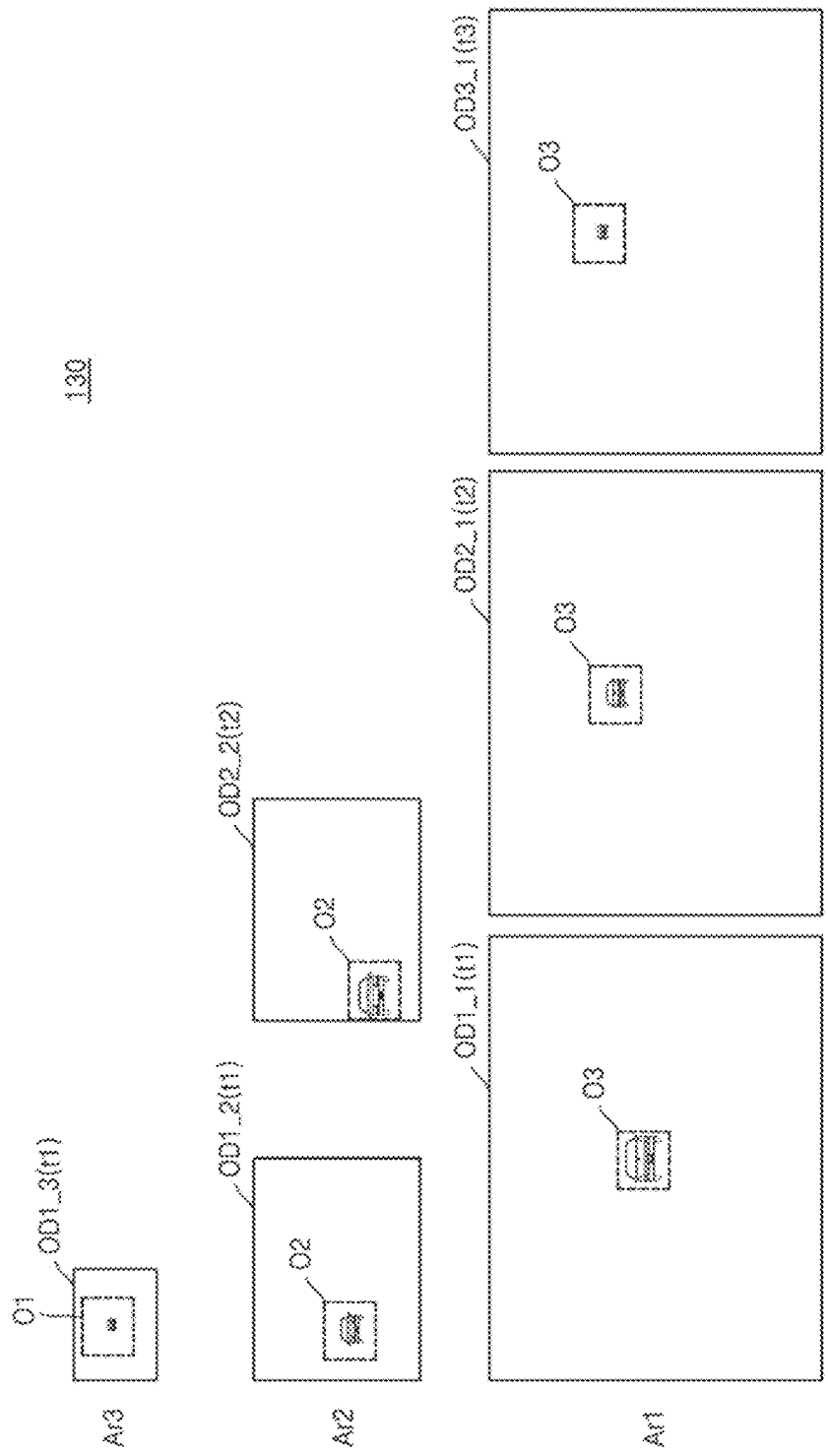
FIG. 10 is a diagram illustrating object data according to an embodiment of the disclosure.

FIG. 10 is a diagram illustrating object data according to an embodiment of the disclosure. In particular, FIG. 10 illustrates an embodiment in which an object detecting system generates a different number of pieces of object data for each object.

Referring to FIGS. 9 and 10, the object detecting system 100 may store the third object data OD1_3 corresponding to the first object O1 in the third area Ar3 of the buffer 130, may store the second and fifth object data OD1_2 and OD2_2 corresponding to the second object O2 in the second area Ar2 of the buffer 130, and may store the first, fourth, and sixth object data OD1_1, OD2_1, and OD3_1 corresponding to the third object O3 in the first area Ar1 of the buffer 130.

The first object O1 may be an object relatively close to an image-capturing device, and there may be a relatively large amount of spatial information regarding the first object O1. In other words, an object at a position near to a position at which an image is captured may appear large in the image. Therefore, the object may be represented by a correspondingly large amount of information and/or pixels. Accordingly, the object detecting system 100 may detect the first object O1 by using only the third object data OD1_3 corresponding to one first time point t1. On the other hand, the third object O3 may be an object relatively far from the image-capturing device, and there may be a relatively small amount of spatial information regarding the third object O3. Therefore, by using the first, fourth, and sixth object data OD1_1, OD2_1, and OD3_1 corresponding to a plurality of time points (for example, the first to third time points t1 to t3), the object detecting system 100 may supplement a relatively small amount of spatial information with pieces of object data respectively corresponding to the plurality of time points, and thus, efficient object detection may be performed.

Figure 11:
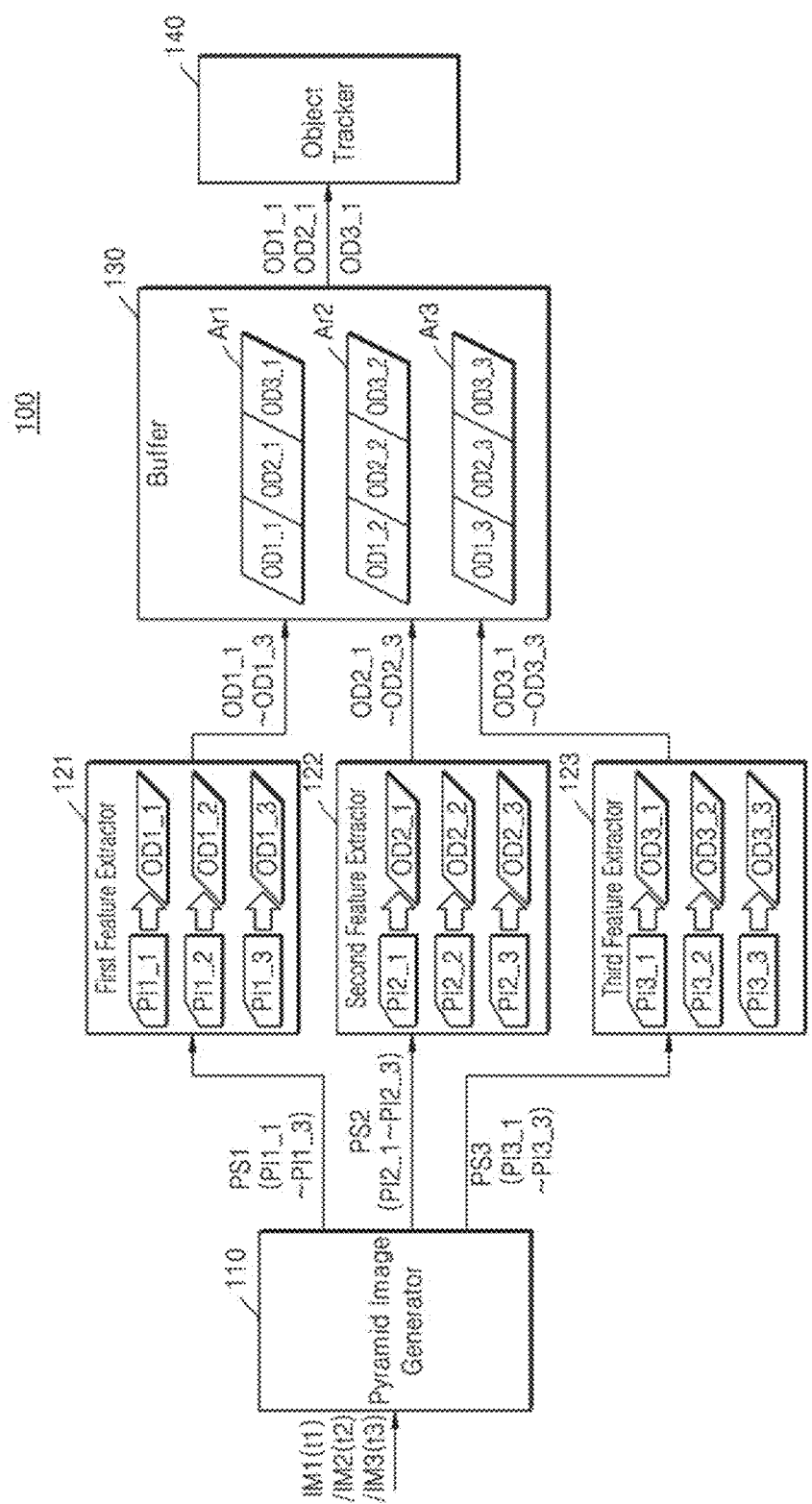
FIG. 11 is a block diagram illustrating an object detecting system according to an embodiment of the disclosure.

FIG. 11 is a block diagram illustrating an object detecting system according to an embodiment of the disclosure. In particular, FIG. 11 illustrates an embodiment in which the object tracker 140 selectively determines the number of pieces of object data required for object tracking. Redundant descriptions with reference to FIG. 7 will be omitted.

Referring to FIG. 11, the object detecting system 100 may include the pyramid image generator 110, the first feature extractor 121, the second feature extractor 122, the third feature extractor 123, the buffer 130, and the object tracker 140. The pyramid image generator 110 may receive the first input image IM1 captured at the first time point t1, the second input image IM2 captured at the second time point t2, and the third input image IM3 captured at the third time point t3.

The pyramid image generator 110 may output, to the first feature extractor 121, the first to third pyramid images PI1_1, PI1_2, and PI1_3 as the first pyramid image set PS1, the first to third pyramid images PI1_1 to PI1_3 being generated by the method described above. In a similar manner, the pyramid image generator 110 may output, to the second feature extractor 122, the fourth to sixth pyramid images PI2_1, PI2_2, and PI2_3 as the second pyramid image set PS2 and may output, to the third feature extractor 123, seventh to ninth pyramid images PI3_1, PI3_2, and PI3_3 as a third pyramid image set PS3.

The first feature extractor 121 may generate the first to third object data OD1_1 to OD1_3 by respectively extracting objects from the first to third pyramid images PI1_1 to PI1_3 corresponding to the first time point t1. The first feature extractor 121 may store the generated first object data OD1_1 in the first area Ar1 of the buffer 130, may store the generated second object data OD1_2 in the second area Ar2 of the buffer 130, and may store the generated third object data OD1_3 in the third area Ar3 of the buffer 130.

In a similar manner, the second feature extractor 122 may generate fourth to sixth object data OD2_1 to OD2_3 by respectively extracting objects from the fourth to sixth pyramid images PI2_1 to PI2_3 corresponding to the second time point t2. The second feature extractor 122 may store the fourth object data OD2_1 in the first area Ar1 of the buffer 130, may store the fifth object data OD2_2 in the second area Ar2 of the buffer 130, and may store the sixth object data OD2_3 in the third area Ar3 of the buffer 130.

The third feature extractor 123 may generate seventh to ninth object data OD3_1 to OD3_3 by respectively extracting objects from the seventh to ninth pyramid images PI3_1 to PI3_3 corresponding to the third time point t3. The third feature extractor 123 may store the seventh object data OD3_1 in the first area Ar1 of the buffer 130, may store the eighth object data OD3_2 in the second area Ar2 of the buffer 130, and may store the ninth object data OD3_3 in the third area Ar3 of the buffer 130.

The object tracker 140 may track an object by reading at least some of pieces of object data (for example, OD1_1 to OD3_3) stored on an object basis. According to one embodiment of the disclosure, the object tracker 140 may track an object by using only some of the pieces of object data (for example, OD1_1 to OD3_3) stored on an object basis. In one example, the object tracker 140 may track a first object by using only the first object data OD1_1 and the fourth object data OD2_1 that are some of the first object data OD1_1, the fourth object data OD2_1, and the seventh object data OD3_1, which correspond to the first object.

Figure 12:
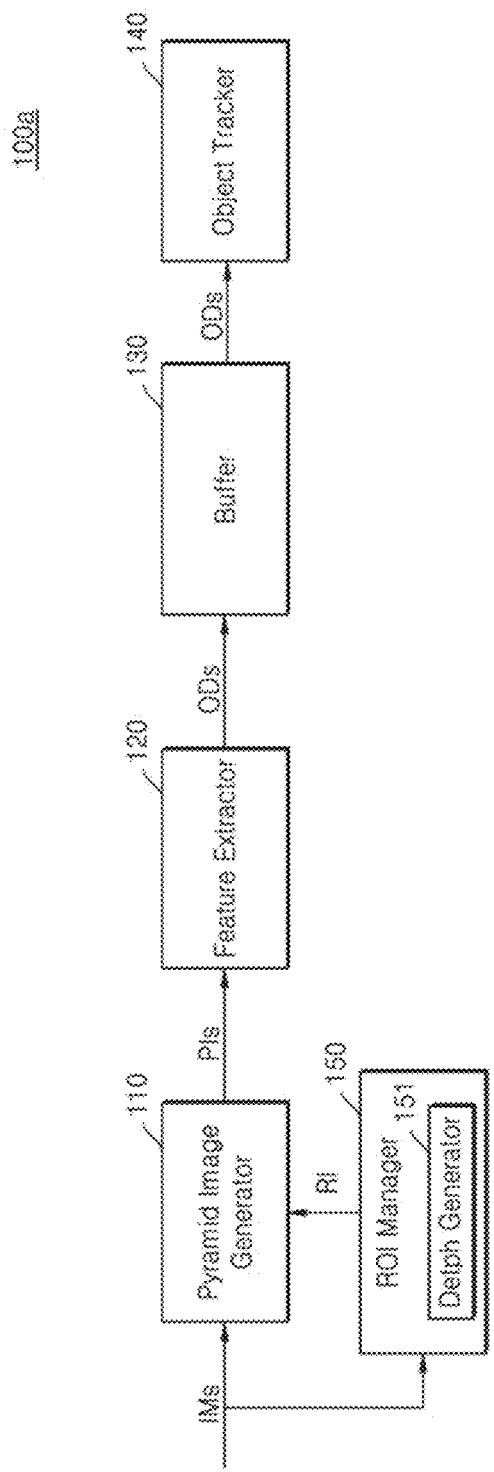
FIG. 12 is a block diagram illustrating an object detecting system according to an embodiment of the disclosure.

FIG. 12 is a block diagram illustrating an object detecting system according to an embodiment of the disclosure. In particular, FIG. 12 illustrates an object detecting system, which detects an object based on a region of interest (ROI). Redundant descriptions with reference to FIG. 3 will be omitted.

Referring to FIG. 12, an object detecting device 100a may include the pyramid image generator 110, the feature extractor 120, the buffer 130, the object tracker 140, and an ROI manager 150. The ROI manager 150 may identify, as an ROI, a partial area included in an input image IMs, based on the input image IMs, and may output ROI information RI including data indicating the ROI. For example, when the object detecting device 100a is included in a driving assistance system, the ROI manager 150 may identify, as the ROI, a region including information required for vehicle driving by analyzing the input image IMs. For example, the ROI may be a region including a driving road, another vehicle, a traffic light, a crosswalk, or the like.

The ROI manager 150 may include a depth generator 151. The depth generator 151 may generate a depth map including depth data regarding an object and a background, which are included in the input image IMs. In one example, the input image IMs may include a left-eye image and a right-eye image, and the depth generator 151 may calculate a depth by using the left-eye image and the right-eye image and may obtain a depth map based on the calculated depth. In another example, the depth generator 151 may obtain the depth map regarding the object and the background, which are included in the input image IMs, by using 3-dimensional information obtained from a distance sensor.

The ROI manager 150 may generate the ROI information RI by using the depth map generated by the depth generator 151. In one example, the ROI manager 150 may set, as the ROI, a region within a certain distance, based on the depth map.

The ROI manager 150 may output the generated ROI information RI to the pyramid image generator 110, and the pyramid image generator 110 may generate pyramid images PIs based on the ROI information RI. In one embodiment, the pyramid image generator 110 may mask a portion of the input image IMs, which is not an ROI, based on the ROI information RI and may generate the pyramid images PIs by using only an unmasked portion thereof. In other words, the pyramid image generator 110 may not consider regions of the input image IM outside of the region of interest ROI indicated by the ROI information. Thereby, efficiency of the input image IM by the pyramid image generator 110 may be improved.

Figure 13:
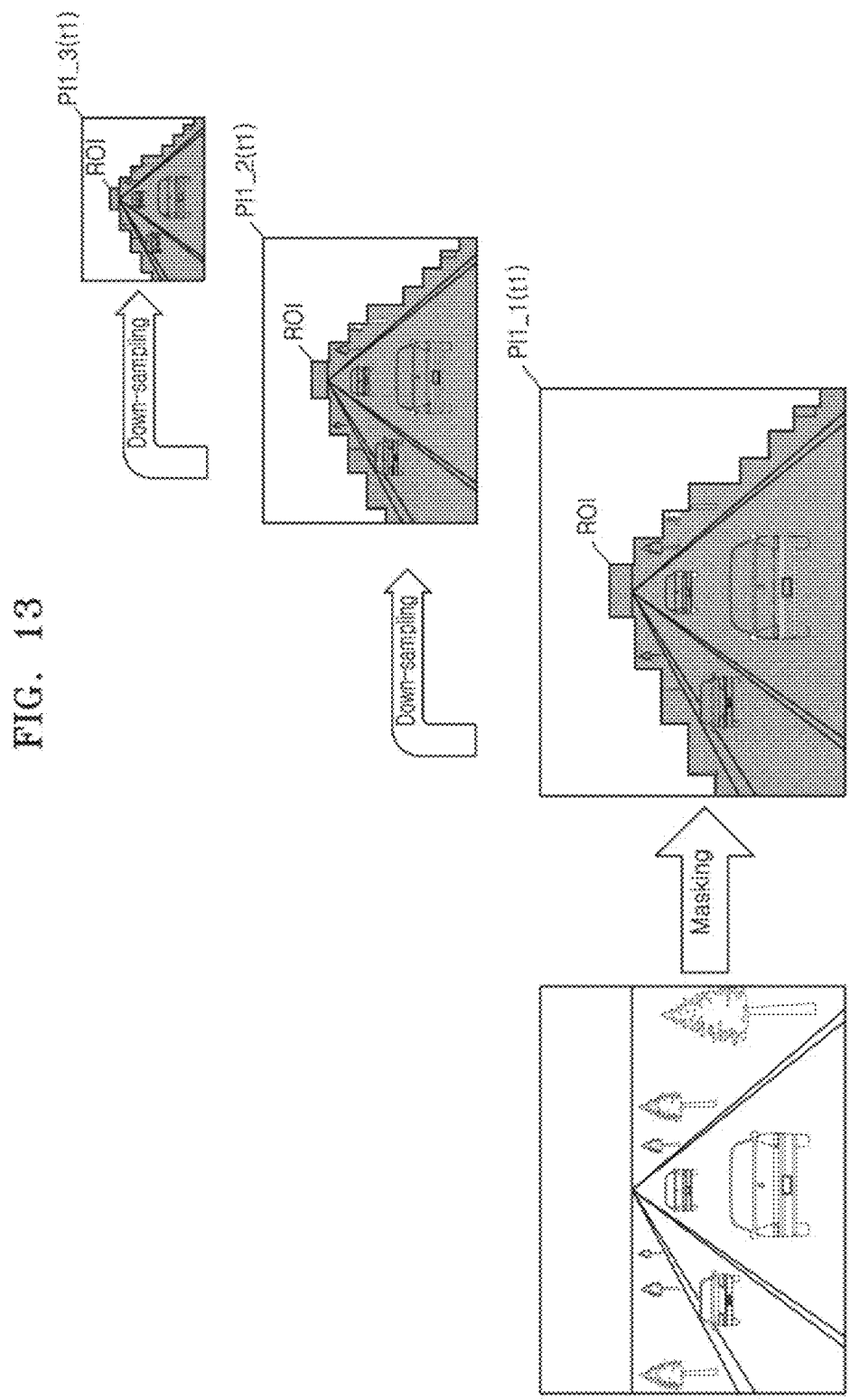
FIG. 13 is a diagram illustrating a method of generating a pyramid image, according to an embodiment of the disclosure.

FIG. 13 is a diagram illustrating a method of generating a pyramid image, according to an embodiment of the disclosure.

Referring to FIGS. 12 and 13, the pyramid image generator 110 may receive the first input image IM1 corresponding to the first time point t1 and may add time information corresponding to the first time point t1 to the first input image IM1. In addition, the pyramid image generator 110 may generate the first pyramid image PI1_1 by masking a region outside of the ROI based on the ROI information RI. The ROI may include all the first to third objects O1 to O3.

The pyramid image generator 110 may generate the second pyramid image PI1_2 by down-sampling the masked first pyramid image PI1_1 and may generate the third pyramid image PI1_3 by down-sampling the second pyramid image PI1_2. The object detecting system 100 may detect the third object O3 by using the masked first pyramid image PI1_1, may detect the second object O2 by using the masked second pyramid image PI1_2, and may detect the third object O3 by using the masked third pyramid image PI1_3. According to one embodiment of the disclosure, by detecting an object after masking an input image, a masked region outside of the ROI may not be considered and detection performance may be improved.

Figure 14:
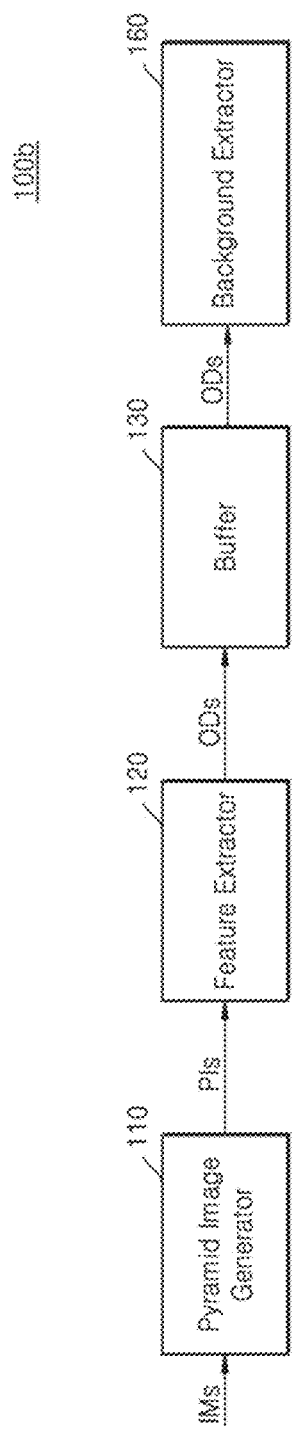
FIG. 14 is a block diagram illustrating an object detecting system according to an embodiment of the disclosure.

FIG. 14 is a block diagram illustrating an object detecting system according to an embodiment of the disclosure. In particular, FIG. 14 illustrates an object detecting system which detects a background by using object data. Redundant descriptions with reference to FIG. 3 will be omitted.

Referring to FIG. 14, an object detecting system 100b may include the pyramid image generator 110, the feature extractor 120, the buffer 130, the object tracker 140, and a background extractor 160. The background extractor 160 may receive, from a buffer, a plurality of pieces of object data ODs stored on an object basis and may extract a background of the input image IMs based on the plurality of pieces of object data ODs. In one example, the background extractor 160 may extract the background by removing at least one object from the input image IMs based on the pieces of object data ODs. According to one embodiment of the disclosure, the background extractor 160 may remove objects from the background based on the pieces of object data ODs corresponding to a plurality of time points.

Figure 15:
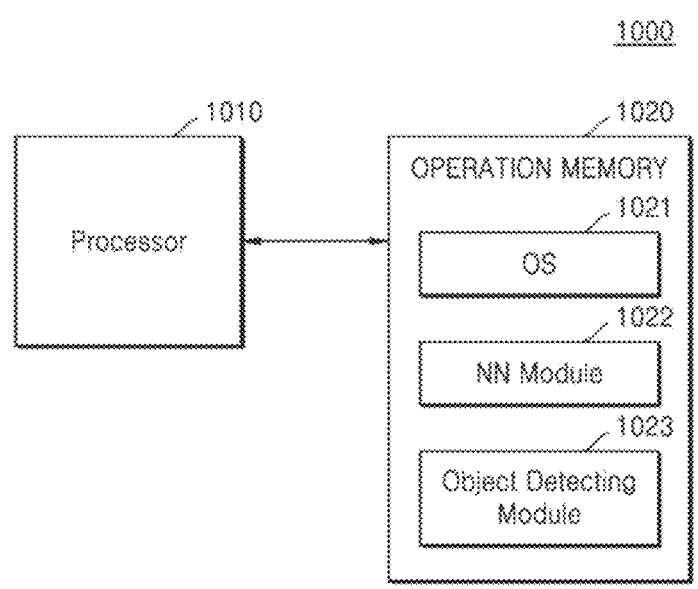
FIG. 15 is a block diagram illustrating an application processor according to an embodiment of the disclosure.

FIG. 15 is a block diagram illustrating an application processor according to an embodiment of the disclosure. An application processor 1000 shown in FIG. 15 may be a semiconductor chip and may be implemented by a system-on-chip (SoC).

The application processor 1000 may include a processor 1010 and operation memory 1020. In addition, the application processor 1000 may further include one or more IP modules connected to a system bus. The operation memory 1020 may store software such as various programs and instructions related to operations of a system in which the application processor 1000 is used. As an example, the operation memory 1020 may include an operating system 1021, a neural network module 1022, and an object detecting module 1023. The processor 1010 may execute the object detecting module 1023 loaded into the operation memory 1020 and, according to the embodiments described above, may perform a function of detecting an object from an input image based on time information.

One or more pieces of hardware may include the processor 1010 and may perform operations of a neural network by executing the neural network module 1022, and as an example, the one or more pieces of hardware may generate object data from a pyramid image according to the embodiments described above.

Figure 16:
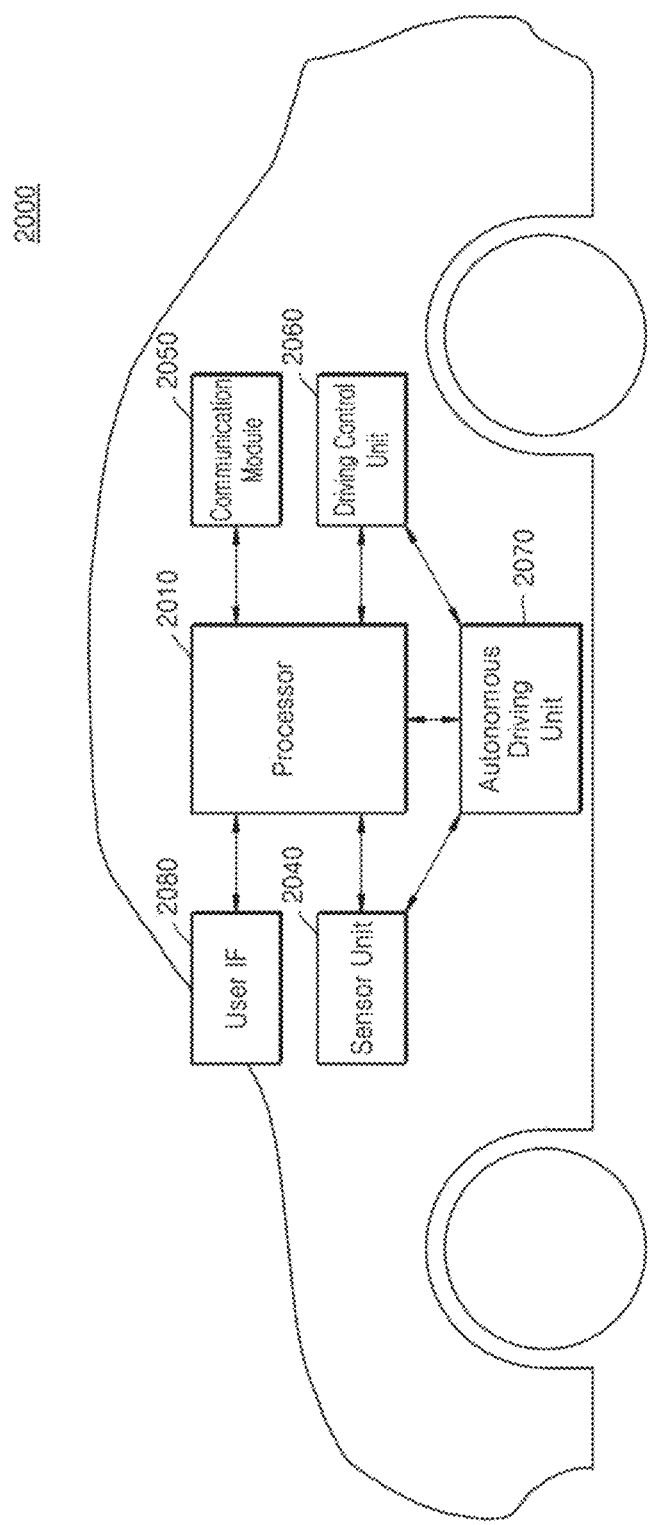
FIG. 16 is a block diagram illustrating a driving assistance system according to an embodiment of the disclosure.

FIG. 16 is a block diagram illustrating a driving assistance system according to an embodiment of the disclosure.

Referring to FIG. 16, a driving assistance system 2000 may include a processor 2010, a sensor unit 2040, a communication module 2050, a driving control unit 2060, an autonomous driving unit 2070, and a user interface 2080. The processor 2010 may control overall operations of the driving assistance system 2000 and, according to the embodiments described above, may detect an object from an input image received from the sensor unit 2040 with reference to time information.

The sensor unit 2040 may collect information about an object sensed by the driving assistance system 2000. In one example, the sensor unit 2040 may be an image sensor unit and may include at least one image sensor. The sensor unit 2040 may sense or receive an image signal from outside the driving assistance system 2000 and may convert the image signal into image data, that is, an image frame.

In another example, the sensor unit 2040 may be a distance sensor unit and may include at least one distance sensor. The distance sensor may include, for example, at least one of various sensing devices such as a light detection and ranging (LIDAR) sensor, a radio detection and ranging (RADAR) sensor, a time-of-flight (ToF) sensor, an ultrasonic sensor, an infrared sensor, and the like. Each of the LIDAR sensor and the RADAR sensor may be classified depending upon effective measuring distances. As an example, the LIDAR sensor may be classified into a long LIDAR sensor and a short LIDAR sensor, and the RADAR sensor may be classified into a long RADAR sensor and a short RADAR sensor. The disclosure is not limited thereto, and the sensor unit 2040 may include at least one selected from a geomagnetic sensor, a position sensor (for example, a global positioning system (GPS)), an acceleration sensor, a barometric pressure sensor, a temperature/humidity sensor, a proximity sensor, and a gyroscope, without being limited thereto.

The communication module 2050 may transmit data to and receive data of the driving assistance system 2000. In one example, the communication module 2050 may perform communication in the manner of vehicle-to-everything (V2X). As an example, the communication module 2050 may perform communication in the manner of vehicle-to-vehicle (V2V), vehicle-to-infrastructure (V2I), vehicle-to-pedestrian (V2P), and vehicle-to-nomadic devices (V2N). However, the disclosure is not limited thereto, and the communication module 2050 may transmit and receive data in various communication manners that are publicly known. For example, the communication module 2050 may perform communication by a communication method such as 3G, Long Term Evolution (LTE), Wi-Fi, Bluetooth, Bluetooth Low Energy (BLE), Zigbee, Near Field Communication (NFC), or ultrasonic communication, and may include both short-range communication and long-range communication.

The sensor unit 2040 may generate an input image by capturing a picture of the environment or surroundings outside of the driving assistance system 2000 and may transmit the input image to the processor 2010. The processor 2010 may detect an object (for example, another vehicle), based on the input image and time at which the input image is captured, and may control the driving control unit 2060 and the autonomous driving unit 2070. Although there is provided an example in which the processor 2010 detects an object based on the input image, the processor 2010 may detect an object based on depth information that is output by a distance sensor, in another example.

The driving control unit 2060 may include: a vehicle steering device configured to control a direction of a vehicle; a throttle device configured to control acceleration and/or deceleration by controlling a motor or an engine of the vehicle; a brake system configured to control the braking of the vehicle; an exterior lighting device; and the like. The autonomous driving unit 2070 may include a computing device configured to implement autonomous control of the driving control unit 2060. For example, the autonomous driving unit 2070 may include at least one of components of the driving assistance system 2000. The autonomous driving unit 2070 may include memory storing a plurality of program instructions, and one or more processors executing the program instructions. The autonomous driving unit 2070 may be configured to control the driving control unit 2060 based on a sensing signal that is output from the sensor unit 2040. The user interface 2080 may include various electronic devices and mechanical equipment, such as a display displaying a dashboard of the vehicle, included in a driver seat, a passenger seat, or the like.

The processor 2010 may use various pieces of sensing data, such as the input image, the depth information, and the like, in detecting an object. In this case, the processor 2010 may use an artificial neural network for efficient operation processing, and may perform any of the object detection methods described in the disclosure.

While the disclosure has been particularly shown and described with reference to embodiments thereof, it will be understood that various changes in form and details may be made therein without departing from the spirit and scope of the following claims.

What is claimed is:

1. An object detecting system comprising:
    a pyramid image generator configured to receive a first input image captured at a first time and a second input image captured at a second time, and generate a first pyramid image from the first input image and a second pyramid image from the second input image;
    an object extractor configured to detect an object in the first pyramid image and the second pyramid image and generate a plurality of pieces of object data representing the object; and
    a buffer storing the plurality of pieces of the object data representing the object detected in the first input image and the second input image,
    wherein the object comprises a first object and a second object which is located relatively closer to the object detecting system than the first object,
    wherein the pyramid image generator further configured to:
        generate the first pyramid image having a first resolution by adding first time information corresponding to the first time to the first input image;
        generate a third pyramid image having a second resolution which is lower than the first resolution, by down-sampling the first pyramid image; and
        generate the second pyramid image having the first resolution by adding second time information corresponding to the second time to the second input image, and
    wherein the object extractor further configured to:
        generate first object data of the first object among the plurality of pieces of the object data by extracting the first object from the first pyramid image by using a deep learning model trained based on a neural network;
        generate second object data of the first object among the plurality of pieces of the object data by extracting the first object from the second pyramid image by using the deep learning model; and
        generate third object data of the second object among the plurality of pieces of the object data by extracting the second object from the third pyramid image by using the deep learning model.

2. The object detecting system of claim 1, wherein the pyramid image generator is further configured to:
    generate a fourth pyramid image having a third resolution which is lower than the second resolution, by down-sampling the third pyramid image; and
    generate a fifth pyramid image having the second resolution by down-sampling the second pyramid image.

3. The object detecting system of claim 2, wherein the object further comprises a third object which is located closer to the object detecting system than the second object, and
    wherein the object extractor is further configured to:
        generate forth object data of the third object among the plurality of pieces of the object data by extracting the third object from the fourth pyramid image by using a deep learning model trained based on a neural network; and
        generate fifth object data of the second object among the plurality of pieces of the object data by extracting the second object from the fifth pyramid image by using the deep learning model.

4. The object detecting system of claim 3, wherein the first object is located relatively far from an image-capturing device capturing the first input image and the second input image, and the second object is located relatively closer to the image-capturing device than the first object.

5. The object detecting system of claim 1, wherein the object extractor is further configured to:
    store the first object data of the first object and the second object data of the first object in a first area of the buffer; and
    store the third object data of the second object in a second area of the buffer.

6. The object detecting system of claim 5, further comprising:
    an object tracker configured to track the first object by using at least one object data among the plurality of pieces of the object data selected from the first object data and the second object data stored in the first area and the first time information, and track the second object by using at least one object data among the plurality of pieces of the object data selected from the third object data stored in the second area and the second time information.

7. The object detecting system of claim 1, wherein the pyramid image generator is further configured to:
    generate a first pyramid image set including the first pyramid image and the second pyramid image; and
    generate a second pyramid image set by down-sampling at least one of the first pyramid image and the second pyramid image in the first pyramid image set, and
    wherein the object extractor is further configured to:
    generate, from the first pyramid image set, N pieces of first object data respectively corresponding to N time points among the plurality of pieces of the object data, wherein N is a natural number; and
    generate, from the second pyramid image set, M pieces of second object data respectively corresponding to M time points among the plurality of pieces of the object data, wherein M is a natural number.

8. The object detecting system of claim 7, wherein N is greater than M.

9. The object detecting system of claim 7, wherein the object comprises a first object and a second object, and
    wherein the object detecting system further comprises an object tracker configured to:
        track the first object by using P pieces of the first object data among the N pieces of first object data, wherein P is a natural number less than or equal to N; and
        track the second object by using Q pieces of the second object data among the M pieces of second object data, wherein Q is a natural number that is less than or equal to M.

10. The object detecting system of claim 1, further comprising:
a region-of-interest manager configured to set a first region of interest for the first input image and a second region of interest for the second input image,
wherein the object extractor is further configured to extract the object from a first region of the first input image and a second region of the second input image, the first region and the second region corresponding to the first region of interest and the second region of interest.

11. An method of detecting an object using an object detecting system, the method comprising:
receiving a first input image captured at a first time and a second input image captured at a second time;
generating a first pyramid image associated with the first time from the first input image and a second pyramid image associated with the second time from the second input image;
generating a plurality of pieces of object data representing the object detected in the first input image and the second input image based on the first pyramid image and the second pyramid image; and
storing the plurality of pieces of the object data in a buffer,
wherein the object comprises a first object and a second object which is located relatively closer to the object detecting system than the first object,
wherein the generating the first pyramid image and the second pyramid image comprises:
generating the first pyramid image having a first resolution by adding first time information corresponding to the first time to the first input image;
generating a third pyramid image having a second resolution which is lower than the first resolution, by down-sampling the first pyramid image; and
generating the second pyramid image having the first resolution by adding second time information corresponding to the second time to the second input image, and
wherein the generating the plurality of pieces of the object data comprises:
generating first object data of the first object among the plurality of pieces of the object data by extracting the first object from the first pyramid image by using a deep learning model trained based on a neural network;
generating second object data of the first object among the plurality of pieces of the object data by extracting the first object from the second pyramid image by using the deep learning model; and
generating third object data of the second object among the plurality of pieces of the object data by extracting the second object from the third pyramid image by using the deep learning model.

12. The method of claim 11, wherein the generating the first pyramid image and the second pyramid image further comprises:
generating a fourth pyramid image having a third resolution which is lower than the second resolution, by down-sampling the third pyramid image; and
generating a fifth pyramid image having the second resolution by down-sampling the second pyramid image.

13. The method of claim 12, wherein the object further comprises a third object which is located closer to the object detecting system than the second object, and wherein the generating of the plurality of pieces of the object data further comprises:
generating fourth object data of the third object among the plurality of pieces of the object data by extracting the third object from the fourth pyramid image by using a deep learning model trained based on a neural network; and
generating fifth object data of the second object among the plurality of pieces of the object data by extracting the second object from the fifth pyramid image by using the deep learning model.

14. The method of claim 13, wherein the first object is located relatively far from an image-capturing device capturing the first input image and the second input image, and the second object is located relatively closer to the image-capturing device than the first object.

15. The method of claim 11, wherein the storing comprises:
storing, in a first area of the buffer, the first object data of the first object and the second object data of the first object; and
storing, in a second area of the buffer, the third object data of the second object.

16. The method of claim 15, further comprising:
tracking the first object by using at least one object data among the plurality of pieces of the object data selected from the first object data and the second object data stored in the first area and the first time information; and
tracking the second object by using at least one object data among the plurality of pieces of the object data selected from the third object data stored in the second area.

17. The method of claim 11, wherein the generating first pyramid image and the second pyramid image comprises:
generating a first pyramid image set including the first pyramid image and the second pyramid image; and
generating a second pyramid image set by down-sampling at least one of the first pyramid image and the second pyramid image in the first pyramid image set, and
wherein the generating the plurality of pieces of the object data comprises:
generating, from the first pyramid image set, N pieces of first object data respectively corresponding to N time points, among the plurality of pieces of the object data, wherein N is a natural number; and
generating, from the second pyramid image set, M pieces of second object data respectively corresponding to M time points, among the plurality of pieces of the object data, wherein M is a natural number.

18. The method of claim 17, wherein the object comprises a first object and a second object, and
wherein the method further comprises:
tracking the first object by using P pieces of the first object data among the N pieces of first object data, wherein P is a natural number less than or equal to N; and
tracking the second object by using Q pieces of the second object data among the M pieces of second object data, wherein Q is a natural number that is less than or equal to M.

19. A driving assistance system for driving a vehicle by detecting an object, the driving assistance system comprising:
a pyramid image generator configured to receive a first input image captured at a first time and a second input image captured at a second time and generate a first pyramid image from the first input image and a second pyramid image from the second input image;

an object extractor configured to detect the object in the first pyramid image and the second pyramid image and generate a plurality of pieces of object data representing the object, by using deep learning that is based on a neural network;

a buffer storing the plurality of pieces of the object data representing the object detected in the first input image and the second input image; and an object tracker configured to track the object based on the plurality of pieces of the object data stored in the buffer, wherein the object comprises a first object and a second object which is located relatively closer to the driving assistance system than the first object, wherein the pyramid image generator further configured to:

generate the first pyramid image having a first resolution by adding first time information corresponding to the first time to the first input image;

generate a third pyramid image having a second resolution which is lower than the first resolution, by down-sampling the first pyramid image; and generate the second pyramid image having the first resolution by adding second time information corresponding to the second time to the second input image, and wherein the object extractor further configured to:

generate first object data of the first object among the plurality of pieces of the object data by extracting the first object from the first pyramid image by using the deep learning model;

generate second object data of the first object among the plurality of pieces of the object data by extracting the first object from the second pyramid image by using the deep learning model; and generate third object data of the second object among the plurality of pieces of the object data by extracting the second object from the third pyramid image by using the deep learning model.

20. The driving assistance system of claim 19, wherein the pyramid image generator is further configured to:

generate a first pyramid image set including the first pyramid image and the second pyramid image; and generate a second pyramid image set by down-sampling at least one of the first pyramid image and the second pyramid image, and wherein the object extractor is further configured to:

generate, from the first pyramid image set, N pieces of first object data respectively corresponding to N time points among the plurality of pieces of the object data, wherein N is a natural number; and generate, from the second pyramid image set, M pieces of second object data respectively corresponding to M time points among the plurality of pieces of the object data, wherein M is a natural number.

* * * * *